US011893959B2

(12) United States Patent
Kim et al.

(10) Patent No.: US 11,893,959 B2
(45) Date of Patent: Feb. 6, 2024

(54) ELECTRONIC DEVICE INCLUDING PROXIMITY SENSOR HAVING A PLURALITY OF LIGHT RECEIVING ELEMENTS AND METHOD OF CONTROLLING THE SAME

(71) Applicant: Samsung Electronics Co., Ltd., Suwon-si (KR)

(72) Inventors: Yeonsoo Kim, Suwon-si (KR); Youngjae Kim, Suwon-si (KR); Minho Lee, Suwon-si (KR); Jaekwang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 17/710,003

(22) Filed: Mar. 31, 2022

(65) Prior Publication Data

US 2022/0366869 A1 Nov. 17, 2022

Related U.S. Application Data

(63) Continuation of application No. PCT/KR2022/003354, filed on Mar. 10, 2022.

(30) Foreign Application Priority Data

May 17, 2021 (KR) .......................... 10-2021-0063707

(51) Int. Cl.
  *G09G 5/10* (2006.01)
  *G06F 3/01* (2006.01)
  (Continued)

(52) U.S. Cl.
  CPC .................. *G09G 5/10* (2013.01); *G01J 5/10* (2013.01); *G06F 3/011* (2013.01); *G01J 5/022* (2013.01); *G09G 2360/145* (2013.01)

(58) Field of Classification Search
  CPC .. G01J 5/064; G01J 5/0022; G01J 5/10; G01J 5/0215; G01J 5/04; G01J 5/0265;
  (Continued)

(56) References Cited

U.S. PATENT DOCUMENTS 9,311,893 B2 * 4/2016 Kwon ...................... G09G 3/36
9,620,081 B2 * 4/2017 Tripathi ................... G09G 5/36
(Continued)

FOREIGN PATENT DOCUMENTS

| CN | 106598358 A | 4/2017 |
| CN | 108021225 A | 5/2018 |

(Continued)

OTHER PUBLICATIONS

International Search Report dated Jun. 14, 2022, issued in International Application No. PCT/KR2022/003354.

*Primary Examiner* — Vinh T Lam
(74) *Attorney, Agent, or Firm* — Jefferson IP Law, LLP

(57) ABSTRACT

An electronic device may include: a display having at least one hole disposed in at least a part thereof such that light from the outside can be transmitted therethrough; a light-emitting element disposed under the display and configured to output a first infrared ray to the outside; a first light-receiving element disposed under the display at a position corresponding to the at least one hole, and configured to receive a second infrared ray transmitted from the outside; a second light-receiving element disposed under the display at a position where light from the outside is shielded; and at least one processor configured to, based on that a first sensing value according to the second infrared ray, output from the first light-receiving element, satisfies a first specified condition, while the first infrared ray is output: based on that a second sensing value output from the second light-receiving element does not satisfy a second specified condition, identify that a proximate object exists, and based on (Continued)

that the second sensing value satisfies the second specified condition, identify that the proximate object does not exist.

20 Claims, 13 Drawing Sheets

(51) Int. Cl.
*G01J 5/10* (2006.01)
*G01J 5/02* (2022.01)

(58) Field of Classification Search
CPC ...... G01J 2005/065; G01J 5/022; G01J 5/025; G09G 5/10; G09G 3/20; G09G 2360/145; G06F 3/011; G06F 3/0412; G06F 3/0421; G06F 3/017; G06F 2203/04108; G06F 2203/04103
See application file for complete search history.

(56) References Cited

U.S. PATENT DOCUMENTS

| | | | | |
|---|---|---|---|---|
| 9,728,163 B2* | 8/2017 | Ma | ...................... | G06F 3/04883 |
| 9,818,332 B2* | 11/2017 | Su | ...................... | H04N 5/202 |
| 10,043,456 B1* | 8/2018 | de Greef | ............... | G09G 3/3406 |
| 10,096,299 B2* | 10/2018 | Xiong | ...................... | G06T 5/009 |
| 10,204,539 B2* | 2/2019 | Bell | ...................... | G09G 3/2003 |
| 10,546,524 B2* | 1/2020 | Bell | ...................... | G09G 3/2003 |
| 10,672,336 B2* | 6/2020 | Lee | ...................... | G09G 3/3233 |
| 10,789,888 B2* | 9/2020 | Zhang | ...................... | G06F 3/042 |
| 10,928,957 B2* | 2/2021 | Eriksson | ............... | G06F 3/0421 |
| 10,976,886 B2* | 4/2021 | Kim | ...................... | G06F 3/0481 |
| 10,977,996 B2* | 4/2021 | Lee | ...................... | G09G 3/3233 |
| 11,237,672 B2* | 2/2022 | Wang | ...................... | G01S 17/42 |
| 11,244,995 B2* | 2/2022 | Cho | ...................... | G06F 1/3206 |
| 11,380,285 B2* | 7/2022 | Choi | ...................... | G09G 3/035 |
| 11,527,097 B2* | 12/2022 | Cho | ...................... | G06V 40/1318 |
| 11,573,363 B2* | 2/2023 | Zou | ...................... | G06F 1/1637 |
| 11,769,439 B2* | 9/2023 | Xiao | ...................... | G09G 3/2007 |
| | | | | 345/690 |
| 2012/0050228 A1* | 3/2012 | Choi | ...................... | G06F 3/0421 |
| | | | | 345/175 |
| 2012/0212453 A1 | 8/2012 | Huang et al. | | |
| 2013/0120761 A1 | 5/2013 | Dyer et al. | | |
| 2015/0062087 A1 | 3/2015 | Cho et al. | | |
| 2016/0239093 A1* | 8/2016 | Chua | ...................... | G06F 3/0416 |
| 2018/0120475 A1 | 5/2018 | Lee et al. | | |
| 2019/0090806 A1 | 3/2019 | Clavelle et al. | | |
| 2019/0196546 A1* | 6/2019 | Wu | ...................... | G01J 5/025 |
| 2020/0105194 A1 | 4/2020 | Kim et al. | | |
| 2020/0142533 A1 | 5/2020 | Seo et al. | | |
| 2020/0152724 A1* | 5/2020 | Cho | ...................... | H10K 59/40 |
| 2020/0367827 A1 | 11/2020 | Min et al. | | |
| 2021/0034832 A1 | 2/2021 | Lee et al. | | |
| 2021/0278907 A1* | 9/2021 | Ito | ...................... | G06F 3/04815 |
| 2023/0343267 A1* | 10/2023 | Wen | ...................... | G06F 3/0488 |

FOREIGN PATENT DOCUMENTS

| | | |
|---|---|---|
| JP | 2017-126686 A | 7/2017 |
| KR | 10-2006-0035925 A | 4/2006 |
| KR | 10-2013-0052486 A | 5/2013 |
| KR | 10-2015-0024530 A | 3/2015 |
| KR | 10-2019-0064786 A | 6/2019 |
| KR | 10-2020-0024300 A | 3/2020 |
| KR | 10-2020-0050162 A | 5/2020 |
| KR | 10-2020-0087411 A | 7/2020 |
| KR | 10-2021-0014249 A | 2/2021 |
| WO | 20-161075 A1 | 8/2020 |

* cited by examiner

ELECTRONIC DEVICE INCLUDING PROXIMITY SENSOR HAVING A PLURALITY OF LIGHT RECEIVING ELEMENTS AND METHOD OF CONTROLLING THE SAME

CROSS-REFERENCE TO RELATED APPLICATION(S)

This application is a continuation application, claiming priority under § 365(c), of an International application No. PCT/KR2022/003354, filed on Mar. 10, 2022, which is based on and claims the benefit of a Korean patent application number 10-2021-0063707, filed on May 17, 2021, in the Korean Intellectual Property Office, the disclosure of which is incorporated by reference herein in its entirety.

FIELD

The disclosure relates to an electronic device including a proximity sensor having multiple light-receiving elements, and a method for controlling the same.

DESCRIPTION OF RELATED ART

An electronic device is equipped with a proximity sensor to determine whether an object (for example, a person) is proximate to the electronic device. the proximity sensor may include, for example, a light-emitting element configured to output light and a light-receiving element configured to receive light which has been output, reflected at an object, and returned thereto. The electronic device may use the proximity sensor to determine whether there exists an object proximate to the electronic device and to provide various functions according to whether the same exists.

Meanwhile, an electronic device (for example, a mobile device) may include a display (for example, a touch screen), and electronic devices having displays disposed to occupy the majority of area of the front surfaces (for example, front covers) of electronic devices, in order to maximize the available area of displays, are commercially available. Accordingly, an electronic device may have at least one sensor disposed below the display in an under display sensor type.

The above information is presented as background information only to assist with an understanding of the disclosure. No determination has been made, and no assertion is made, as to whether any of the above might be applicable as prior art with regard to the disclosure.

SUMMARY

As described above, an electronic device may have at least one sensor (for example, a proximity sensor) disposed below the display.

However, if the proximity sensor is mounted below the display, degradation of performance of the proximity sensor may be caused by structures included in the display. For example, structures disposed on a path of light (for example, infrared rays) output from the proximity sensor to the outside or received by the proximity sensor from the outside may reflect or scatter the light (for example, infrared rays), thereby reducing the detection accuracy of the proximity sensor regarding whether an object is proximate. In order to solve this, the intensity of optical output from the light-emitting element of the proximity may be increased, but heating of the light-emitting element and/or light-receiving element may occur, thereby causing a problem, such as temperature drift and/or crosstalk in the light-receiving element.

Aspects of the disclosure are to address at least the above-mentioned problems and/or disadvantages and to provide at least the advantages described below. Various embodiments may provide an electronic device including one or more proximity sensors each having two or more light-receiving elements, and a method for controlling the same.

Various embodiments may provide an electronic device including a proximity sensor having two or more light-receiving elements, one (for example, sub light-receiving element) of which is disposed in a position in which external light is not received (for example, does not reach), and a method for controlling the same.

Various embodiments may provide an electronic device including having two or more light-receiving elements configured such that an output value (for example, sensing value) of one light-receiving element (for example, sub light-receiving element) is used to correct an output value of another light-receiving element (for example, main light-receiving element) (for example, offset is applied to output value), and a method for controlling the same.

Additional aspects will be set forth in part in the description which follows and, in part, will be apparent from the description, or may be learned by practice of the embodiments.

According to various embodiments, an electronic device may include: a display having at least one hole disposed in at least a part thereof such that light from an outside can be transmitted therethrough; a light-emitting element disposed under the display and configured to output a first infrared ray to the outside; a first light-receiving element disposed under the display at a position corresponding to the at least one hole, and configured to receive a second infrared ray transmitted from the outside; a second light-receiving element disposed under the display at a position where light from the outside is shielded; and at least one processor, wherein the at least one processor is configured to, based on that a first sensing value according to the second infrared ray, output from the first light-receiving element, satisfies a first specified condition, while the first infrared ray is output: based on that a second sensing value output from the second light-receiving element does not satisfy a second specified condition, identify that a proximate object exists, and based on that the second sensing value satisfies the second specified condition, identify that the proximate object does not exist.

According to various embodiments, an electronic device may include: a display having at least one hole disposed in at least a part thereof such that light from an outside can be transmitted therethrough; a light-emitting element disposed under the display and configured to output a first infrared ray to the outside; a first light-receiving element disposed under the display at a position corresponding to the at least one hole, and configured to receive a second infrared ray transmitted from the outside; a second light-receiving element disposed under the display at a position where light from the outside is shielded; and at least one processor, wherein the at least one processor is configured to, while the first infrared ray is output, identify a first sensing value according to the second infrared ray, output from the first light-receiving element, and a second sensing value output from the second light-receiving element, based on that the identified second sensing value satisfies a second specified condition, correct the first sensing value, based on the identified second sensing value, and identify whether a proximate object exists, based on the corrected first sensing value.

According to various embodiments, an electronic device may include: a display having at least one hole disposed in at least a part thereof such that light from an outside can be transmitted therethrough; a light-emitting element disposed under the display and configured to output a first infrared ray to the outside; a first light-receiving element disposed under the display at a position corresponding to the at least one hole, and configured to receive a second infrared ray transmitted from the outside; a second light-receiving element disposed under the display at a position where light from the outside is shielded; and at least one processor, wherein the at least one processor is configured to, while the first infrared ray is output, identify a first sensing value according to the second infrared ray, output from the first light-receiving element, based on that the identified first sensing value satisfies a first specified condition, identify a second sensing value output from the second light-receiving element, based on the identified second sensing value, correct at least one first sensing value output from the first light-receiving element, and based on the corrected at least one first sensing value, identify whether a proximate object exists.

According to various embodiments, an electronic device may use an output value (for example, a sensing value) of a light-receiving element shielded from the outside so as to prevent performance degradation (for example, an erroneous detection regarding whether an object is proximate) of a proximity sensor due to an external factor, such as heating of a light-emitting element and/or light-receiving element.

According to various embodiments, an electronic device may reduce external influences, such as heating of a light-emitting element and/or a light-receiving element such that, by using light at a high output intensity, accuracy of proximate object detection is improved.

According to various embodiments, an electronic device may improve accuracy of proximate object detection of a proximity sensor, thereby providing various functions conforming to user convenience.

Various advantageous effects exhibited by the disclosure are not limited to the above-mentioned advantageous effects. Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
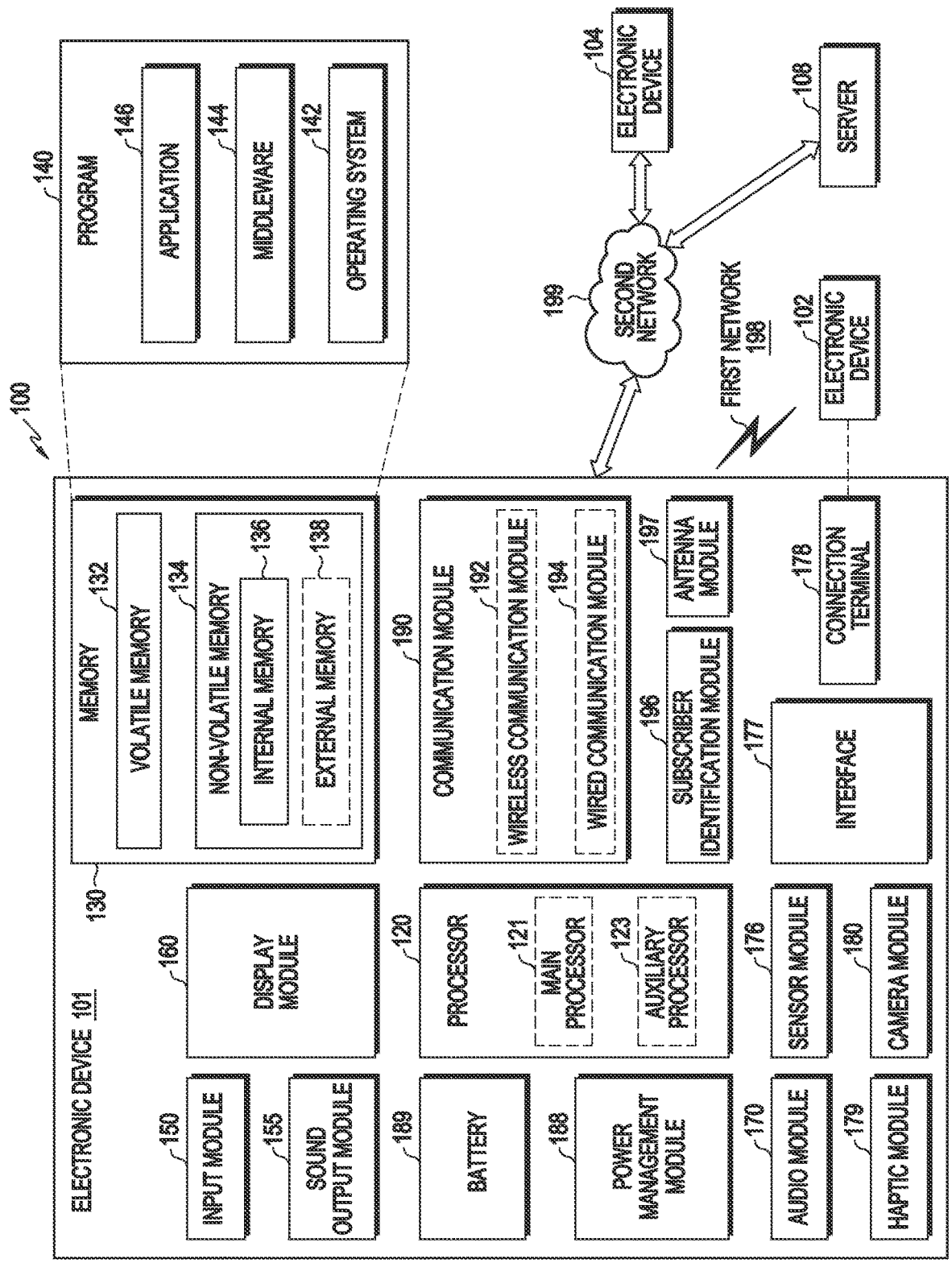
FIG. 1 is a block diagram of an electronic device in a network environment according to various embodiments.

FIG. 1 is a block diagram of an electronic device in a network environment according to various embodiments.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
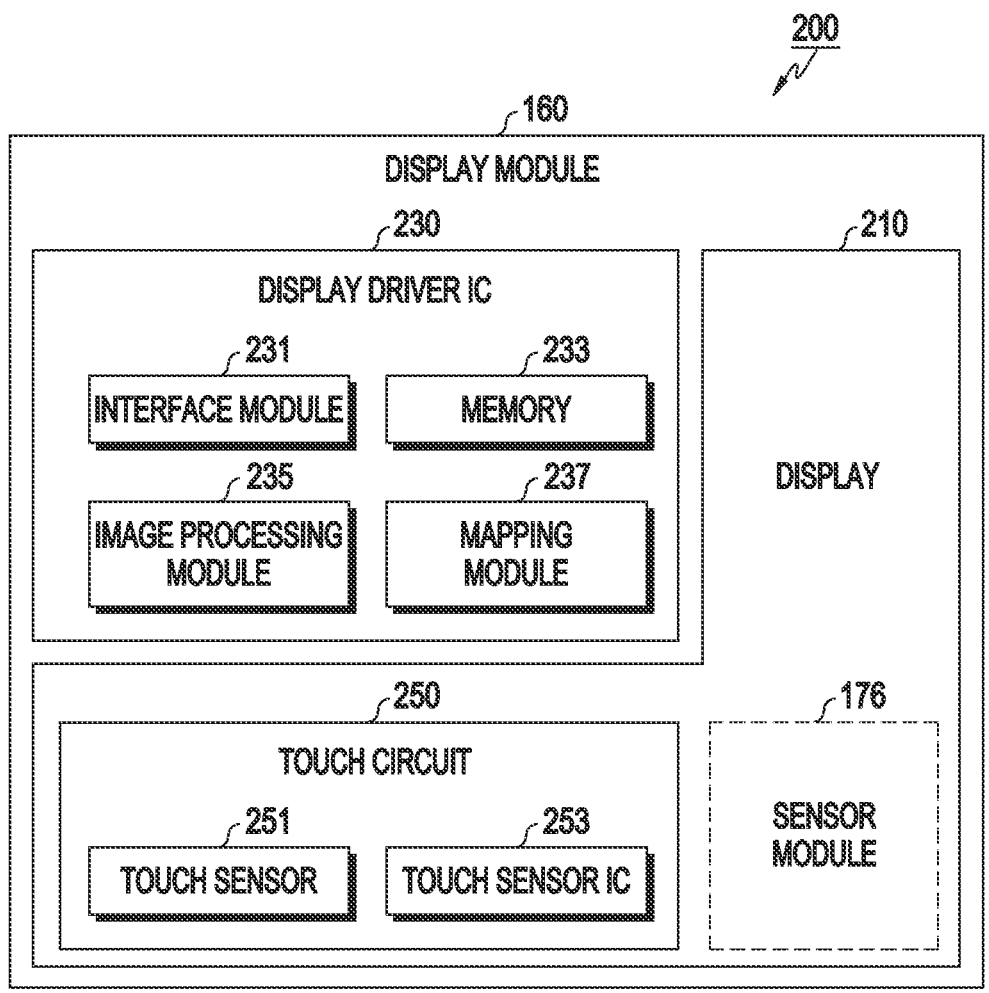
FIG. 2 is a block diagram of a display module according to various embodiments.

FIG. 2 is a block diagram illustrating a display module according to various embodiments.

Referring to FIG. 2, the display module 160 may include a display 210 and a display driver integrated circuit (DDI) 230 to control the display 210. The DDI 230 may include an interface module 231, a memory 233 (e.g., a buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 135. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
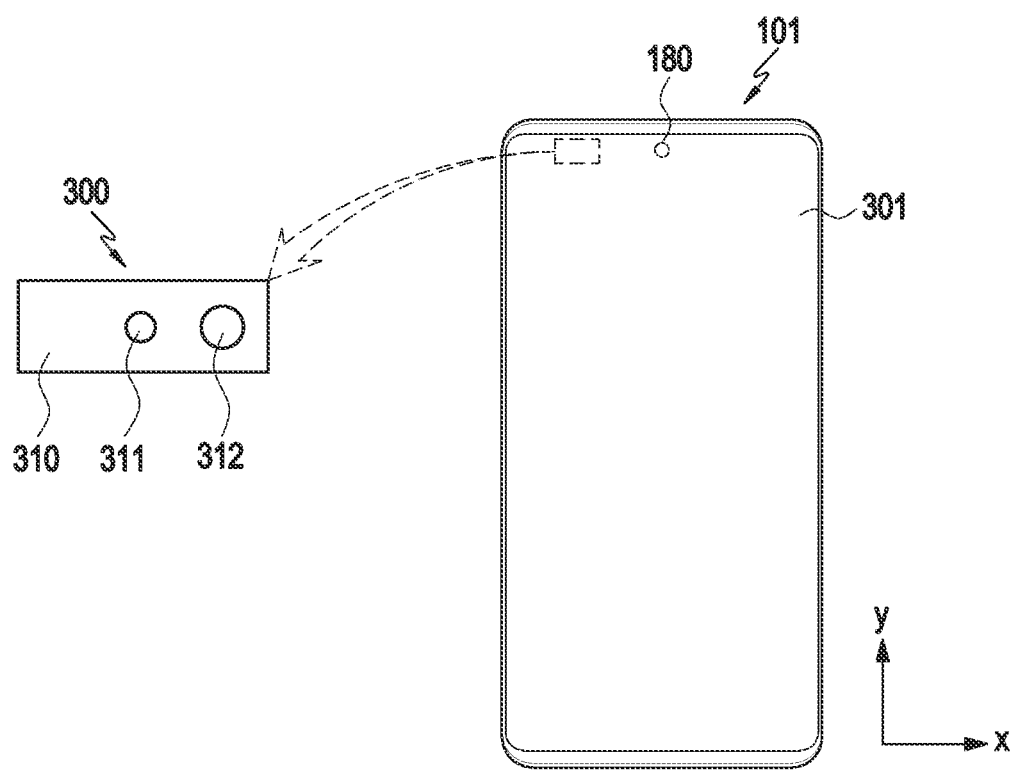
FIG. 3A is a diagram illustrating an example of arrangement of a proximity sensor in an electronic device, according to various embodiments.
Figure 3B:
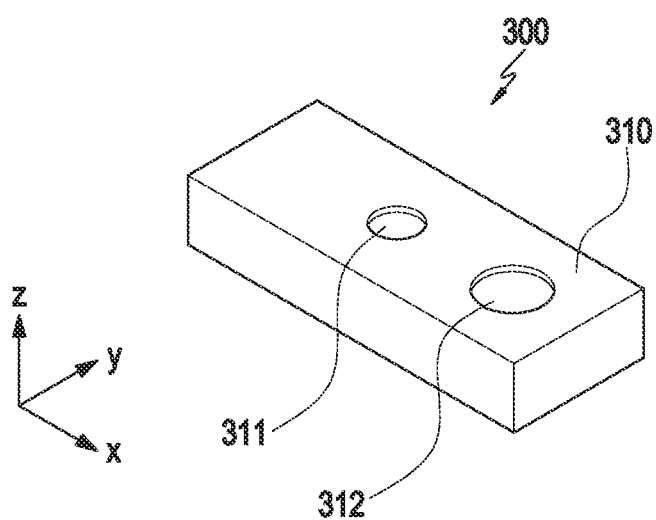
FIG. 3B is a diagram illustrating an example of a proximity sensor according to various embodiments.

FIG. 3A is a diagram illustrating an example of arrangement of a proximity sensor in an electronic device according to various embodiments. FIG. 3B is a diagram illustrating an example of a proximity sensor according to various embodiments.

According to various embodiments, the electronic device 101 may include at least one sensor (e.g., the sensor module 176) disposed under a display module 301. For example, the at least one sensor disposed under the display module 301 may include a proximity sensor, a fingerprint sensor, a camera sensor, a time-of-flight (ToF) sensor, a heart rate monitoring (HRM) sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and/or an illuminance sensor.

Referring to FIG. 3A, according to various embodiments, the display module 301 may occupy most of a front cover (e.g., a front cover 400 to be described later) of the electronic device 101 when the front surface of the electronic device 101 is viewed. Such a display module 301 may be referred to as, for example, a whole surface display, an infinity display, and/or a punch-hole display. According to various embodiments, the proximity sensor 300 may be disposed under the display module 301. According to various embodiments, the proximity sensor 300 may be disposed adjacent to a position where the camera module 180 is exposed. According to various embodiments, at least one hole (e.g., a through-hole) for allowing light (e.g., light in an infrared band (hereinafter, an infrared ray)) to transmit therethrough may be disposed in at least a part (e.g., a subsidiary material layer 420 to be described later) of the display module 301, and the proximity sensor 300 may be disposed to be aligned with the at least one hole (e.g., a through-hole). According to an embodiment, various sensors (e.g., an illuminance sensor) for receiving light transmitted from the outside may be disposed to be aligned with the at least one hole (e.g., a through-hole). According to an embodiment, a proximity-illuminance sensor in which an illuminance sensor and a proximity sensor are integrally implemented may be disposed to be aligned with the at least one hole (e.g., a through hole).

Referring to FIG. 3B, according to various embodiments, the proximity sensor 300 may include a body portion 310 having at least one opening (e.g., a first opening 311 and/or a second opening 312). For example, the opening may be described as a concept including a recess, a hole, and/or a groove. According to an embodiment, the proximity sensor 300 may be integrally configured with at least a part (e.g., a subsidiary material layer 420 to be described later) of the display module 301, and may be included in the display module 301. According to an embodiment, the proximity sensor 300 may not include the body portion 310 (e.g., a housing), and may be integrally configured with at least a part (e.g., a subsidiary material layer 420 to be described later) of the display module 301. According to various embodiments, the first opening 311 and the second opening 312 may be disposed to correspond to positions where the at least one hole (e.g., a through-hole) of the display module 301 is disposed, respectively. According to various embodiments, the proximity sensor 300 may include at least one light-emitting element (not shown) which outputs light (e.g., an infrared ray) to the outside, and at least one light-receiving element (not shown) which receives light (e.g., an infrared ray) projected from the outside, and the light-emitting element (not shown) and the light-receiving element (not shown) may be disposed to correspond to positions of the at least one opening (e.g., the first opening 311 and the second opening 312), respectively. According to various embodiments, the proximity sensor 300 may include two or more light-receiving elements (not shown). At least one (e.g., a sub light-receiving element) of the two or more light-receiving elements may be disposed such that light projected from the outside is not received. For example, the at least one light-receiving element (e.g., a sub light-receiving element) may be disposed at a position where the at least one hole (e.g., a through-hole) of the display module 301 is not disposed, and the at least one light-receiving element (e.g., a sub light-receiving element) may not receive light projected from the outside, based on the shielding of the light projected from the outside by at least a part (e.g., a subsidiary material layer 420 to be described later) of the display module 301. For another example, the at least one light-receiving element (e.g., a sub light-receiving element) may be disposed at a position where the opening (e.g., the first opening 311 and the second opening 312) is not disposed, and the at least one light-receiving element (e.g., a sub light-receiving element) may not receive light projected from the outside, based on the shielding of the light projected from the outside by the body portion 310. According to various embodiments, the proximity sensor 300 may include a coprocessor (e.g., the coprocessor 123 of FIG. 1) (e.g., a sensor hub processor) configured to control at least one component (e.g., a light-emitting element and/or a light-receiving element) included in the proximity sensor 300 and/or perform processing on a value (e.g., a sensing value) output from at least one component (e.g., a light-receiving element).

Figure 4:
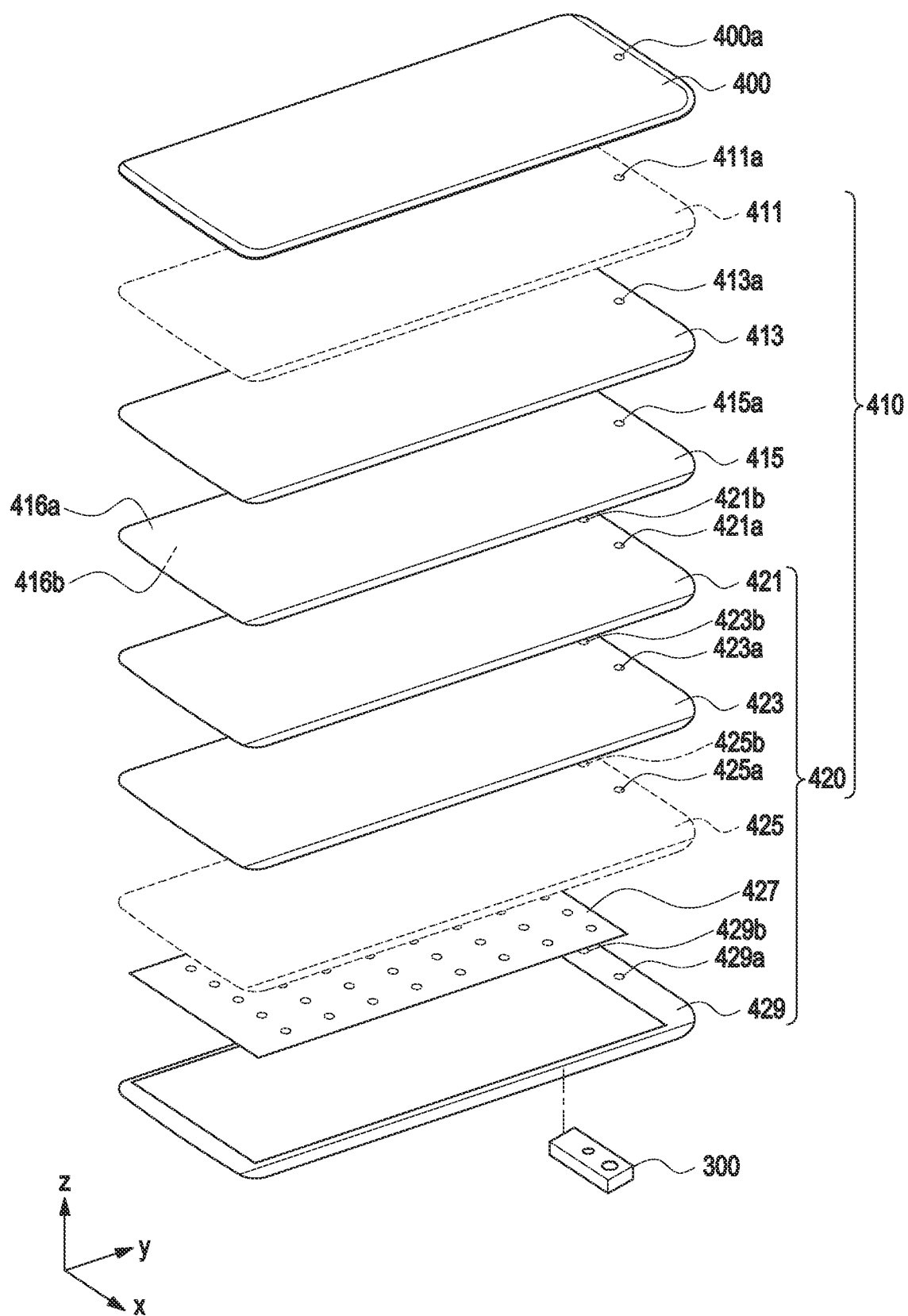
FIG. 4 is an exploded perspective view of a display of an electronic device according to various embodiments.

FIG. 4 is an exploded perspective view of a display of an electronic device according to an embodiment of the disclosure.

Referring to FIG. 4, according to various embodiments, the display 410 may include a display panel 415 including a polarizer (POL) 413 (e.g., a polarizing film) disposed on a rear surface of a front cover 400 (e.g., a front plate, a glass plate, or a cover member) through an adhesive member, and at least one subsidiary material layer 420 attached to a rear surface 416b of the display panel 415. According to various embodiments, the POL 413 may be attached to a front surface 416a of the display panel 415. According to various embodiments, the adhesive member may include an optical clear adhesive (OCA), a pressure sensitive adhesive (PSA), a heat-reactive adhesive, a general adhesive, and/or a double-sided tape.

According to various embodiments, the front cover 400 may include a camera exposure area 400a formed at a position corresponding to a camera module (e.g., the camera module 180 of FIG. 1). According to various embodiments, the camera exposure area 400a may be determined by a printing area (e.g., a black matrix (BM) area) disposed to surround the periphery thereof. According to various embodiments, the size or shape of the printing area may be determined by an angle of view of the camera module 180. According to an embodiment, the front cover 400 may include only the camera exposure area 400a without a separate printing area.

According to various embodiments, the display panel 415 and the POL 413 may be integrally configured. According to an embodiment, the display 410 may additionally include a touch panel 411. According to an embodiment, the display 410 may operate as an in-cell type or on-cell type touch display according to an arrangement position of the touch panel 411. In another embodiment, the display 410 may include a fingerprint sensor (not shown) which operates through the display panel 415. The fingerprint sensor may include an ultrasonic or optical fingerprint sensor capable of recognizing a fingerprint of a finger in contact with or in proximity to the outer surface of the front cover 400 through a hole which is at least partially disposed in a part of the components of the display 410.

According to various embodiments, the at least one subsidiary material layer 420 may include at least one polymer member 421 and 423 disposed on the rear surface 416b of the display panel 415, at least one functional member 427 disposed on a rear surface of the at least one polymer member 421 and 423, and/or a conductive member 429 disposed on a rear surface of the at least one functional member 427. According to various embodiments, the at least one polymer member 421 and 423 may include an embossed layer 421 which removes air bubbles that may be generated between the display panel 415 and lower adhesive elements thereof and/or a cushioning layer 423 disposed for shock mitigation. According to various embodiments, the at least one functional member 427 may include a graphite sheet for heat dissipation, an added display, a force touch FPCB, a fingerprint sensor FPCB, an antenna radiator for communication, a heat dissipation sheet, a conductive or non-conductive tape, or an open cell sponge. According to various embodiments, the conductive member 429 is a metal plate, may help to reinforce the rigidity of the electronic device 101, and may be used to shield ambient noise and dissipate heat emitted from surrounding heat dissipation components. According to various embodiments, the conductive member 429 may include Cu, Al, SUS, or CLAD (e.g., a stacked member in which SUS and Al are alternately disposed). According to an embodiment, the display 410 may further include a detection member 425 for detecting an input by an electromagnetic induction type writing member (e.g., an electronic pen). According to various embodiments, the detection member 425 may include a digitizer. According to various embodiments, the detection member 425 may be disposed between the at least one polymer member 423 and the functional member 427. According to an embodiment, the detection member 425 may be disposed between the display panel 415 and the at least one polymer member 421.

According to various embodiments, the front cover 400 may include the camera exposure area 400a which is at least partially formed in an area overlapping the display panel 415, when the front cover 400 is viewed from above. According to various embodiments, when the front cover 400 is viewed from above, the display panel 415 may include an opening 415a disposed in an area overlapping the camera exposure area 400a. According to various embodiments, the POL 413 and/or the touch panel 411 attached to the display panel 415 may also include openings 413a and 411a disposed at corresponding positions. According to various embodiments, when the front cover 400 is viewed from above, the at least one subsidiary material layer 420 may also include openings 421a, 423a, 429a, and 425a disposed at positions corresponding to the openings 415a.

According to various embodiments, the electronic device 101 may include the proximity sensor 300 disposed in a manner of being attached to the rear surface of the display 410. According to various embodiments, the proximity sensor 300 may detect light projected through the display 410 and reflected by an external object (e.g., a proximate object). According to an embodiment, a camera module, an ultra violet (UV) sensor module, an iris sensor module, a spectral sensor module, an infrared sensor module, an RGB sensor module, and/or a ToF sensor module may be disposed in a manner of being attached to the rear surface of the display 410.

According to various embodiments, the proximity sensor 300 may output light to the outside through the display panel 415 and receive light projected from the outside, but the output or projected light may not transmit at least a part of the subsidiary material layer 420. Accordingly, the subsidiary material layer 420 may include at least one hole 421b, 423b, 429b, and 425b (e.g., a through-hole) disposed at a position corresponding to the proximity sensor 300 in order to receive light output from the proximity sensor 300 disposed under the layer and/or light projected from the outside. According to various embodiments, at least a part of the proximity sensor 300 may be disposed at a position (e.g., a position where the at least one hole 421b, 423b, 429b, and 425b is not disposed) where light of the subsidiary material layer 420 is not transmitted (e.g., is shielded). According to an embodiment, when the electronic device 101 includes a camera sensor module and/or a ToF module, the at least one hole (e.g., a through-hole) may be disposed at positions of the display panel 415 and the POL 413 corresponding to the camera sensor module and/or the ToF module.

Figure 5A:
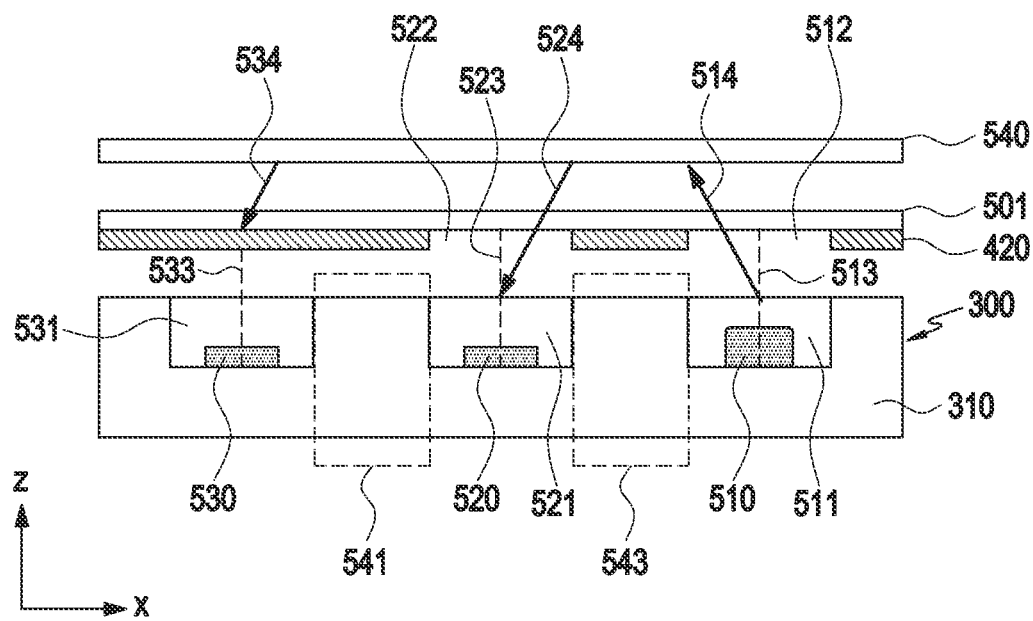
FIG. 5A illustrates an example of a proximity sensor according to various embodiments.
Figure 5B:
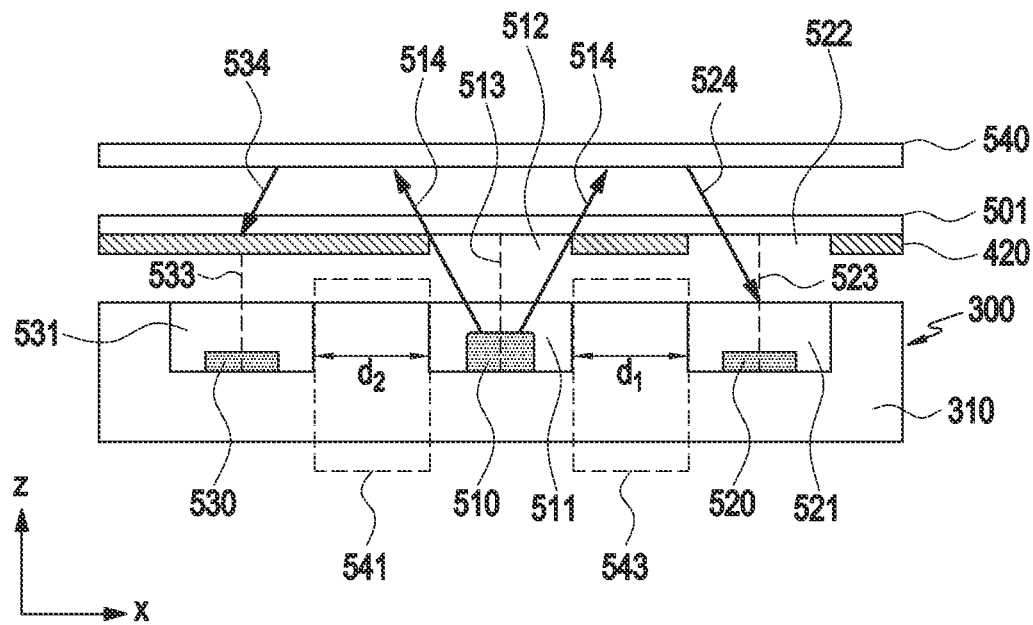
FIG. 5B illustrates another example of a proximity sensor according to various embodiments.
Figure 5C:
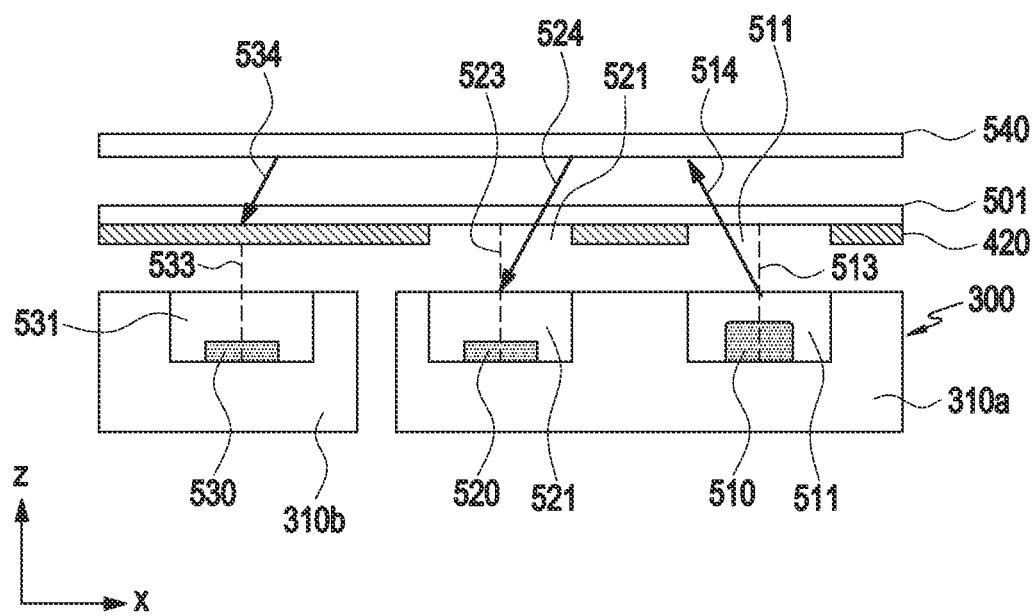
FIG. 5C illustrates still another example of a proximity sensor according to various embodiments.
Figure 5D:
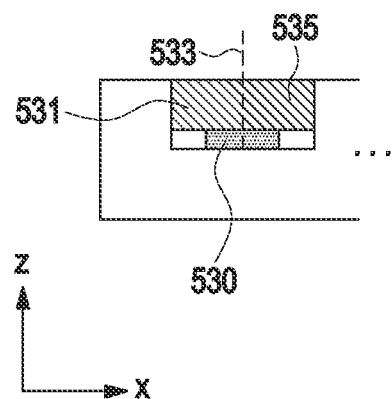
FIG. 5D illustrates an example of a second light-receiving element according to various embodiments.

FIG. 5A illustrates an example of a proximity sensor according to various embodiments. FIG. 5B illustrates another example of a proximity sensor according to various embodiments. FIG. 5C illustrates still another example of a proximity sensor according to various embodiments. FIG. 5D illustrates an example of a second light-receiving element according to various embodiments.

According to various embodiments, the proximity sensor 300 may include at least one light-emitting element (e.g., a light-emitting element 510) and at least one light-receiving element (e.g., a first light-receiving element 520 and/or a second light-receiving element 530). For example, the first light-receiving element 520 is a main light-receiving element which detects light received from the outside, and the second light-receiving element 530 may be a sub light-receiving element for compensating for an error (e.g., a temperature drift) caused by an external factor (e.g., heat generation).

Referring to FIGS. 5A, 5B, 5C and 5D, according to various embodiments, the at least one light-emitting element (e.g., the light-emitting element 510) may include a spectrometer, a vertical cavity surface emitting laser (VCSEL), a light-emitting diode (LED), a white LED, and/or a white laser. According to various embodiments, the at least one light-receiving element (e.g., the first light-receiving element 520 and/or the second light-receiving element 530) may include an avalanche photodiode (PD), a single-photon avalanche diode (SPAD), a photodiode, a photomultiplier tube (PMT), a charge coupled device (CCD), a CMOS array, and/or a spectrometer. According to various embodiments, the structure of the at least one light-receiving element (e.g., the first light-receiving element 520 and/or the second light-receiving element 530) may be a reflective type or a transmissive type. However, the configuration included in the proximity sensor 300 is not limited to the at least one light-emitting element (e.g., the light-emitting element 510) and the at least one light-receiving element (e.g., the first light-receiving element 520 and/or the second light-receiving element 530). For example, the proximity sensor 300 may further include a signal processing unit (not shown) (e.g., an analog front end). The signal processing unit (not shown) may include an amplifier for amplifying a signal output from the at least one light-receiving element (e.g., the first light-receiving element 520 and/or the second light-receiving element 530), and an analog to digital converter (ADC) which converts an analog signal into a digital signal. The configuration included in the signal processing unit (not shown) is not limited to the above-described amplifier and ADC.

According to various embodiments, the light-emitting element 510 may output light (e.g., an infrared ray) to the outside. For example, the light-emitting element 510 may output light to the outside periodically and/or according to the control of at least one processor (e.g., the processor 120 of FIG. 1). For example, the processor 120 may control the light-emitting element 510 to output light (e.g., an infrared ray) when a prespecified application is executed and/or a prespecified function is executed. For another example, the processor 120 may control the light-emitting element 510 to output light (e.g., an infrared ray) when a user input (e.g., a touch input) for executing a prespecified application is received and/or a user input (e.g., a touch input) for executing a prespecified function is received. The light-emitting element 510 may output light (e.g., an infrared ray) until the execution of the prespecified application and/or the prespecified function is terminated (or until a user input (e.g., a touch input) for terminating the execution of the prespecified application and/or the prespecified function is received).

According to various embodiments, the light-receiving elements 520 and 530 may detect light (e.g., an infrared ray) received from the outside. For example, the light received by the light-receiving elements 520 and 530 may include at least a part of the light projected from the outside of the electronic device 101 and/or at least a part of the light reflected and/or scattered inside the electronic device 101. According to various embodiments, when the light received from the outside is detected, the light-receiving elements 520 and 530 may output a sensing value (e.g., an electrical signal) corresponding to the quantity of the detected light. For example, the output sensing value may include a digital electrical signal (e.g., an ADC value) output from the signal processing unit (e.g., an ADC) of each of the light-receiving elements 520 and 530. According to various embodiments, the processor 120 may control the light-receiving elements 520 and 530 to detect light while the light-emitting element 510 outputs light (e.g., an infrared ray).

According to various embodiments, the light-emitting element 510 and/or the light-receiving elements 520 and 530 may be electrically connected to the at least one processor (e.g., the processor 120). For example, the light-emitting element 510 and/or the light-receiving elements 520 and 530 may be electrically connected to an application processor (e.g., the main processor 121 of FIG. 1). The light-emitting element 510 may output light to the outside according to the control of the application processor (e.g., the main processor 121). The light-receiving elements 520 and 530 may output a sensing value to the application processor (e.g., the main processor 121) when light from the outside is detected, and the application processor (e.g., the main processor 121) may identify whether an object (hereinafter, a proximate object) located outside the electronic device 101 exists and/or a distance (or a distance change) between the electronic device 101 and a proximate object, based on the sensing value output from the light-receiving element 520 and 530. For another example, the light-emitting element 510 and/or the light-receiving elements 520 and 530 may be electrically connected to a sensor hub processor (e.g., the coprocessor 123 of FIG. 1). For example, the sensor hub processor (e.g., the coprocessor 123 of FIG. 1) may be included in (e.g., disposed inside) the proximity sensor 300 or disposed outside the proximity sensor 300. The light-emitting element 510 may output light to the outside according to the control of the sensor hub processor (e.g., the coprocessor 123) or the application processor (e.g., the main processor 121). When light from the outside is detected, the light-receiving elements 520 and 530 may output sensing values to the sensor hub processor (e.g., the coprocessor 123). Based on the sensing values output from the light-receiving elements 520 and 530, the sensor hub processor (e.g., the coprocessor 123) may identify whether a proximate object exists and/or a distance (or a distance change) between the electronic device 101 and the proximate object. When it is identified that a proximate object exists (e.g., an external object exists below a threshold distance), the sensor hub processor (e.g., the coprocessor 123) may output an electrical signal and/or information indicating proximity of an object to the application processor (e.g., the main processor 121). The application processor (e.g., the main processor 121) may identify that a proximate object exists when an electrical signal indicating proximity of an object is received from the sensor hub processor (e.g., the coprocessor 123), and may identify that a proximate object does not exist when the electrical signal is not received. Alternatively, the application processor (e.g., the main processor 121) may receive information indicating whether an object is in proximity and/or a distance to a proximate object from the sensor hub processor (e.g., the coprocessor 123), and may identify whether a proximate object exists and/or a distance between the electronic device 101 and the proximate object, based on the received information. According to various embodiments, the light-receiving elements 520 and 530 may detect light received from the outside according to the control of the at least one processor (e.g., the processor 120). For example, the at least one processor (e.g., the processor 120) may control the light-receiving elements 520 and 530 to detect light while the light-emitting element 510 outputs the light (e.g., an infrared ray). For example, the at least one processor (e.g., the processor 120) may control the second light-receiving element 530 to detect light when a sensing value output from the first light-receiving element 520 satisfies a specified condition. According to various embodiments, the light-receiving elements 520 and 530 may be driven when a control signal (e.g., a driving signal) is received from the at least one processor (e.g., the processor 120), so as to detect light received from the outside, and output a sensing value to the at least one processor (e.g., the processor 120).

According to various embodiments, the proximity sensor 300 may include the light-emitting element 510, the first light-receiving element 520, and the second light-receiving element 530. Unlike the illustration, the proximity sensor 300 may include two or more light-emitting elements 510, two or more first light-receiving elements 520, and/or two or more second light-receiving elements 530.

According to various embodiments, the light-emitting element 510, the first light-receiving element 520, and the second light-receiving element 530 may be disposed in a first space 511, a second space 521, and a third space 531 configured in the body portion 310, respectively. According to various embodiments, the first space 511, the second space 521, and the third space 531 may be configured in various ways according to specifications required for the light-emitting element 510, the first light-receiving element 520, and the second light-receiving element 530. According to various embodiments, the first space 511, the second space 521, and the third space 531 may be configured to have different shapes and/or volumes, or may be configured to have the same shape and/or volume.

According to various embodiments, the first light-receiving element 520 and the second light-receiving element 530 may be elements having the same shape and/or size (e.g., volume). According to various embodiments, the first light-receiving element 520 and the second light-receiving element 530 may be elements having different shapes and/or sizes (e.g., volume). For example, the second light-receiving element 530 may be an element having a size smaller than that of the first light-receiving element 520. In this case, the third space 531 in which the second light-receiving element 530 is disposed may be smaller than the second space 521 in which the first light-receiving element 520 is disposed. According to an embodiment, a different sensing element may be disposed in the third space 531 to replace the second light-receiving element 530. For example, a thermistor may be disposed in the third space 531. A resistance value of the thermistor may be inversely proportional to a temperature. The at least one processor (e.g., the processor 120 of FIG. 1) may measure a resistance value of the thermistor to identify a temperature (e.g., the temperature of the thermistor) for the third space 531, and when it is identified that the temperature for the third space 531 increases, perform at least one operation corresponding to the increase in the temperature for the third space 531. For example, when it is identified that the temperature for the third space 531 increases, the at least one processor (e.g., the processor 120) may identify that a temperature drift has occurred in the first light-receiving element 520 and/or the second light-receiving element 530 (e.g., "Yes" in operation 630, "Yes" in operation 730, "Yes" in operation 840, "Yes" in operation 1020, and/or "Yes" in operation 1140), which will be described later.

According to various embodiments, the first space 511, the second space 521, and the third space 531 may be divided by at least one partition wall 541 and 543. According to various embodiments, the at least one partition wall 541 and 543 may be disposed between the light-emitting element 510 and the first light-receiving element 520 or the second light-receiving element 530 so as to prevent at least a part of light output from the light-emitting element 510 and light reflected and/or scattered inside the electronic device 101 from reaching the first light-receiving element 520 or the second light-receiving element 530. According to various embodiments, a shielding member (not shown) made of a material which does not transmit light (e.g., an infrared ray) may be included to prevent light (e.g., an infrared ray) from reaching the second light-receiving element 530. For example, a shielding member made of a material which does not transmit light (e.g., an infrared ray) may be included in an upper part of the third space 531 in which the second light-receiving element 530 is disposed. Referring to FIG. 5D, a shielding member 535 may be included in at least a part of the third space 531 in which the second light-receiving element 530 is disposed. For example, the shielding member 535 may be disposed so as to occupy all or a part (e.g., an upper part) of the third space 531. For example, the shielding member 535 may configure a part of the body portion 310. For another example, the second light-receiving element 530 may be shielded by a shielding member (not shown) (e.g., a shielding member in the form of a rib) made of a material which does not transmit light (e.g., an infrared ray). Accordingly, at least a part of light (e.g., light output from the light-emitting element 510, light reflected and/or scattered inside the electronic device 101, and/or light transmitted through a transmission layer 501 from the outside) may not reach the second light-receiving element 530.

According to various embodiments, the proximity sensor 300 may be disposed under a display (e.g., the display module 301 of FIG. 3A). For example, the proximity sensor 300 may be disposed under the transmission layer 501 and the subsidiary material layer 420. For another example, the proximity sensor 300 may be disposed on at least a part of the subsidiary material layer 420 (e.g., disposed between subsidiary material layers 420). According to various embodiments, the transmission layer 501 may be a member through which light (e.g., an infrared ray) can be transmitted, and for example, referring to FIG. 4, the transmission layer may include at least one component (e.g., the touch panel 411, the POL 413 and/or the display panel 415) other than the subsidiary material layer 420 among the front cover 400 and/or the display 410.

According to various embodiments, the light-emitting element 510 and the first light-receiving element 520 may be disposed 513 and 523 to respectively correspond to holes 512 and 522 (e.g., the at least one hole 421*b*, 423*b*, 429*b*, and 425*b* of FIG. 4) disposed in the subsidiary material layer 420. For example, when looking down from the top (e.g., when viewed in the z-axis direction), a position (e.g., a position on the x-y plane) of the light-emitting element 510 disposed in the first space 511 may at least partially overlap an area (e.g., an area on the x-y plane) of the hole 512, and a position (e.g., a position on the x-y plane) of the first light-receiving element 520 disposed in the second space 521 may at least partially overlap an area (e.g., an area on the x-y plane) of the hole 522. According to various embodiments, the second light-receiving element 530 may be disposed at a position where light is shielded from the outside. For example, the second light-receiving element 530 may be disposed at a position 533 where the at least one hole 421*b*, 423*b*, 429*b*, and 425*b* of the subsidiary material layer 420 is not disposed.

According to various embodiments, the first and second light-receiving elements 520 and 530 may output a sensing value greater than or equal to a prespecified reference value while the light-emitting element 510 outputs light (e.g., a first infrared ray 514), regardless of whether a proximate object 540 exists. According to various embodiments, the above-described "reference value" may be referred to as a "base ADC value". For example, while the proximate object 540 does not exist, at least a part of the light (e.g., the first infrared ray 514) output from the light-emitting element 510 may be reflected and/or scattered by the transmission layer 501 and/or the subsidiary material layer 420, and thus received by the first and second light-receiving elements 520 and 530. The first and second light-receiving elements 520 and 530 may receive the reflected and/or scattered light, and output a sensing value of a prespecified reference value corresponding to the quantity of the received light. According to various embodiments, the prespecified reference value may be determined for each of the first light-receiving element 520 and the second light-receiving element 530, based on the arrangement of the first and second light-receiving elements 520 and 530 (e.g., a distance between the first and second light-receiving elements 520 and 530 and the light-emitting element 510 and/or positions of the first and second light-receiving elements 520 and 530 with respect to the light-emitting element 510). For example, while the light-emitting element 510 outputs light (e.g., the first infrared ray 514), the first light-receiving element 520 may be configured to output a sensing value of a first reference value, based on the nonexistence of the proximate object 540. While the light-emitting element 510 outputs light (e.g., the first infrared ray 514), the first light-receiving element 520 may be configured to output a sensing value exceeding the first reference value, based on the existence of the proximate object 540. For example, while the light-emitting element 510 outputs light (e.g., the first infrared ray 514), the second light-receiving element 530 may be configured to output a sensing value of a second reference value, regardless of whether the proximate object 540 exists. A reference value may be affected by the temperature, and the electronic device 101 may be configured to update the reference value.

According to various embodiments, light (e.g., the first infrared ray 514) output from the light-emitting element 510 may transmit the transmission layer 501 through the first hole 512 to be output to the outside, and the output light (e.g., the first infrared ray 514) may be projected onto the proximate object 540. According to various embodiments, at least a part of light (e.g., the first infrared ray 514) which is output to the outside and projected onto the proximate object 540 may be reflected by the proximate object 540 and projected onto the electronic device 101, and light (e.g., a second infrared ray 524) projected from the proximate object 540 onto the electronic device 101 may transmit the transmission layer 501 and be received by the first light-receiving element 520 through the second hole 522. According to various embodiments, at least a part 534 of the light projected onto the electronic device 101 from the proximate object 540 may be shielded by the subsidiary material layer 420, so as not to be received by the second light-receiving element 530 disposed at a position where the light is shielded. Accordingly, the second light-receiving element 530 may output a sensing value having the second reference value (e.g., a value within a prespecified error range), regardless of the existence and/or distance of the proximate object 540. According to various embodiments, heat may be generated in the light-emitting element 510 and/or the first light-receiving element 520 while the light-emitting element 510 outputs light (e.g., the first infrared ray 514). Accordingly, the second light-receiving element 530 may output a sensing value different from the second reference value (e.g., exceeding the second reference value), regardless of the existence and/or distance of the proximate object 540. It will be described in more detail with reference to the drawings to be described later.

According to various embodiments, the first light-receiving element 520 and the second light-receiving element 530 may be disposed in the same direction with respect to the light-emitting element 510. For example, referring to FIG. 5A, the first and second light-receiving elements 520 and 530 may be disposed in a left direction with respect to the light-emitting element 510. According to various embodiments, the first light-receiving element 520 and the second light-receiving element 530 may be disposed in opposite directions with respect to the light-emitting element 510. For example, referring to FIG. 5B, the first light-receiving element 520 may be disposed in a right direction of the light-emitting element 510, and the second light-receiving element 530 may be disposed in a left direction of the light-emitting element 510. In this case, a distance d1 between the light-emitting element 510 and the first light-receiving element 520 and a distance d2 between the light-emitting element 510 and the second light-receiving element 530 may be the same or different.

Referring to FIG. 5A and/or FIG. 5B, according to various embodiments, the first light-receiving element 520 and the second light-receiving element 530 may be disposed on one substrate (e.g., a printed circuit board, PCB). Referring to FIG. 5C, according to various embodiments, the first light-receiving element 520 and the second light-receiving element 530 may be disposed on different substrates (e.g., a PCB). For example, the first light-receiving element 520 and the second light-receiving element 530 may be included in different body portions 310a and 310b (e.g., a housing). According to various embodiments, the first light-receiving element 520 and the second light-receiving element 530 may be connected to each other to configure a single package. According to various embodiments, the first light-receiving element 520 and the second light-receiving element 530 may be disposed on a flexible PCB (FPCB) and connected to each other.

Figure 6:
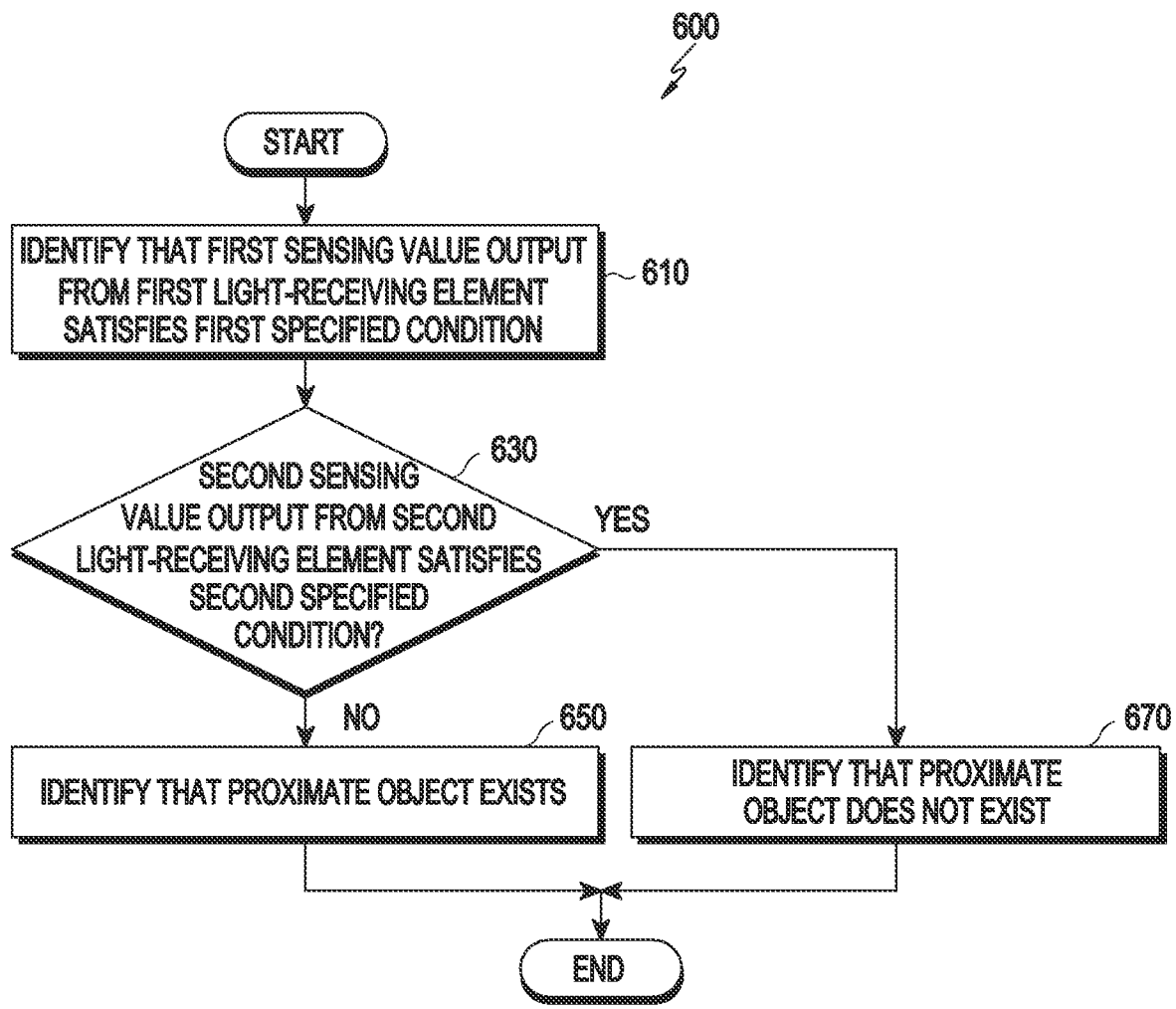
FIG. 6 is a flowchart illustrating a method for identifying object proximity by an electronic device, according to various embodiments.

FIG. 6 is a flowchart 600 illustrating a method for identifying object proximity by an electronic device according to various embodiments. Hereinafter, the operations of the electronic device 101 are described with reference to FIG. 5A, FIG. 5B, and/or FIG. 5C.

According to various embodiments, in operation 610, the electronic device 101 may identify that a first sensing value output from the first light-receiving element 520 satisfies a first specified condition. For example, the first light-receiving element 520 may detect a received light (e.g., a second infrared ray) while light (e.g., the first infrared ray 514) is output from the light-emitting element 510, and may output at least one first sensing value corresponding to the quantity of the detected light. According to various embodiments, the first light-receiving element 520 may be referred to as a main light-receiving element, and the at least one first sensing value output by the first light-receiving element 520 may be referred to as a main ADC value. According to various embodiments, the at least one processor (e.g., the processor 120 of FIG. 1) may receive the at least one first sensing value, and determine whether the received at least one first sensing value satisfies the first specified condition. For example, the first specified condition may include that the first sensing value output from the first light-receiving element 520 exceeds a first reference value (e.g., the reference value of the first light-receiving element 520 described with reference to FIG. 5A, FIG. 5B, and/or FIG. 5C). For another example, the first specified condition may include exceeding a threshold for detecting proximity More specifically, the threshold may be a value that a sensing value exceeds if a proximate object exists and the sensing value does not exceed if the proximate object does not exist, and the threshold may be prespecified to be a value greater than a second reference value, and/or the first reference value. According to various embodiments, the electronic device 101 may identify a first sensing value which satisfies the first specified condition.

According to various embodiments, in operation 630, the electronic device 101 may identify whether a second sensing value output from the second light-receiving element 530 satisfies a second specified condition. For example, the second specified condition may include that a sensing value output from the second light-receiving element 530 exceeds the second reference value. According to various embodiments, the electronic device 101 may monitor the at least one first sensing value output from the first light-receiving element 520, transmit a control signal to the second light-receiving element 530 when a first sensing value which satisfies the first specified condition (e.g., exceeds a threshold for detecting proximity) is identified, and control the second light-receiving element 530 to detect light and output at least one second sensing value. According to an embodiment, the electronic device 101 may monitor the at least one first sensing value of the first light-receiving element 520 and the at least one second sensing value of the second light-receiving element 530 together (e.g., in parallel). According to various embodiments, the electronic device 101 may identify a second sensing value which satisfies the second specified condition among the at least one second sensing value.

According to various embodiments, when it is identified that the second sensing value does not satisfy the second specified condition, in operation 650, the electronic device 101 may identify that the proximate object 540 exists. According to various embodiments, when the second sensing value which satisfies the second specified condition is not identified, the electronic device 101 may identify that the proximate object 540 exists, based on the identification of the first sensing value which satisfies the first specified condition (e.g., exceeds a threshold for detecting proximity). According to an embodiment, after it is identified that the second sensing value does not satisfy the second specified condition, the electronic device 101 may monitor the at least one first sensing value output from the first light-receiving element 520 to identify whether the at least one first sensing value satisfies the first specified condition (e.g., exceeds a threshold for detecting proximity), and identify that the proximate object 540 exists, based on identifying the first sensing value which satisfies the first specified condition.

According to various embodiments, when it is identified that the second sensing value satisfies the second specified condition, in operation 670, the electronic device 101 may identify that the proximate object 540 does not exist. According to various embodiments, when the second sensing value which satisfies the second specified condition is identified, the electronic device 101 may identify that a temperature drift has occurred in the first light-receiving element 520 and/or the second light-receiving element 530. According to various embodiments, when the second sensing value which satisfies the second specified condition is identified, the electronic device 101 may correct the at least one first sensing value, based on the at least one second sensing value. For example, correcting the first sensing value based on the second sensing value may be described as applying an offset to the first sensing value by using the second sensing value. For example, the electronic device 101 may correct the first sensing value, based on the second sensing value identified as satisfying the second specified condition. For another example, after the second sensing value which satisfies the second specified condition is identified, the electronic device 101 may identify the at least one first sensing value output from the first light-receiving element 520 and the at least one second sensing value output from the second light-receiving element 530, and correct the identified first sensing value, based on the identified second sensing value. According to various embodiments, the electronic device may identify whether the corrected first sensing value satisfies the first specified condition (e.g., exceeds a threshold for detecting proximity), and identify that the proximate object 540 does not exist, based on that the corrected first sensing value does not satisfy the first specified condition.

Figure 7:
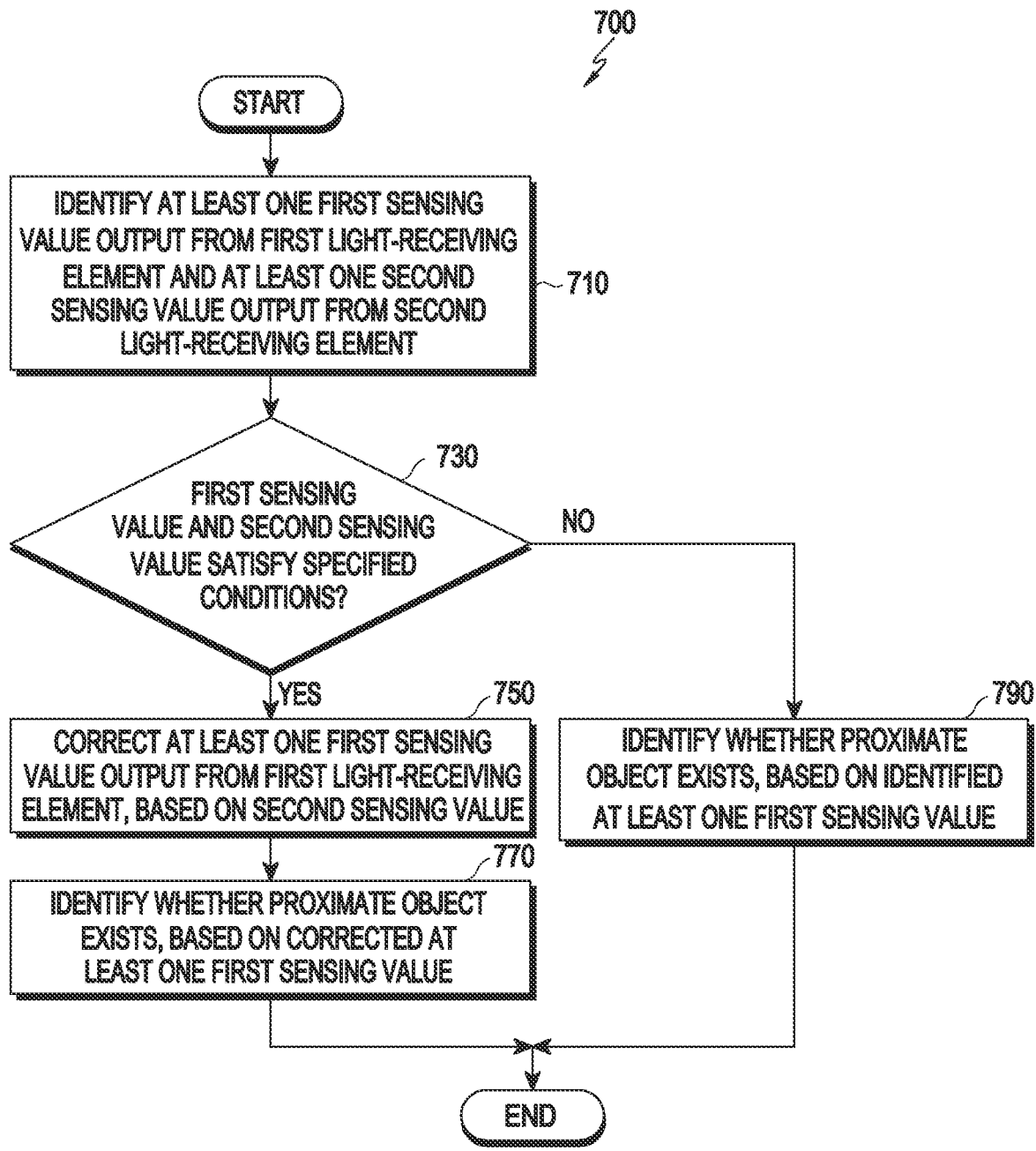
FIG. 7 is a flowchart illustrating an example of a method for identifying object proximity by an electronic device, according to various embodiments.

FIG. 7 is a flowchart illustrating an example of a method for identifying object proximity by an electronic device according to various embodiments. Hereinafter, the operations of the electronic device 101 are described with reference to FIG. 5A, FIG. 5B, and/or FIG. 5C.

According to various embodiments, in operation 710, the electronic device 101 may identify at least one first sensing value output from the first light-receiving element 520 and at least one second sensing value output from the second light-receiving element 530. According to various embodiments, the electronic device 101 may monitor the at least one first sensing value and the at least one second sensing value together (e.g., in parallel). According to various embodiments, the electronic device 101 may monitor the at least one first sensing value and the at least one second sensing value while a prespecified application and/or a prespecified function is executed.

According to various embodiments, in operation 730, the electronic device 101 may identify whether a first sensing value and a second sensing value satisfy specified conditions. For example, the specified conditions may include that the first sensing value satisfies a first specified condition and the second sensing value satisfies a second specified condition. For example, the electronic device 101 may monitor the at least one first sensing value and the at least one second sensing value together (e.g., in parallel), so as to identify whether the first sensing value exceeds a first reference value and the second sensing value exceeds a second reference value.

According to various embodiments, when it is identified that the first sensing value and the second sensing value satisfy the specified conditions, in operation 750, the electronic device 101 may correct the at least one first sensing value output from the first light-receiving element 520, based on the second sensing value. According to various embodiments, when the first sensing value and the second sensing value which satisfy the specified conditions are identified, the electronic device 101 may identify that a temperature drift has occurred in the first light-receiving element 520 and/or the second light-receiving element 530. For example, the electronic device 101 may correct the first sensing value identified as satisfying the first specified condition, based on the second sensing value identified as satisfying the second specified condition. For another example, after it is identified that the first sensing value and the second sensing value satisfy the specified conditions, the electronic device may identify the at least one first sensing value output from the first light-receiving element 520 and the at least one second sensing value output from the second light-receiving element 530, and correct the identified first sensing value, based on the identified second sensing value. According to various embodiments, the electronic device 101 may correct the at least one first sensing value, based on the degree of change in the second sensing value, which is described in more detail with reference to drawings to be described later.

According to various embodiments, in operation 770, the electronic device 101 may identify whether the proximate object 540 exists, based on the corrected at least one first sensing value. For example, the electronic device 101 may identify whether the corrected at least one first sensing value exceeds a threshold for detecting proximity.

According to various embodiments, when it is identified that the first sensing value and the second sensing value do not satisfy the specified conditions, in operation 790, the electronic device 101 may identify whether the proximate object 540 exists, based on the identified at least one first sensing value.

According to various embodiments, after performing operation 770 or 790, the electronic device 101 may repeat operation 710 and subsequent operations. For example, after performing operation 770, the electronic device 101 may monitor sensing values of the first light-receiving element 520 and the second light-receiving element 530, and when the sensing values of the first light-receiving element 520 and the second light-receiving element 530, which do not satisfy the specified conditions, are identified, identify whether the proximate object 540 exists, based on the at least one first sensing value output from the first light-receiving element 520 (operation 790). For example, after performing operation 790, the electronic device 101 may monitor sensing values of the first light-receiving element 520 and the second light-receiving element 530, and when the sensing values of the first light-receiving element 520 and the second light-receiving element 530, which satisfy the specified conditions, are identified, identify whether the proximate object 540 exists, based on the at least one first sensing value corrected based on the sensing value of the second light-receiving element 530 (operation 770).

Figure 8:
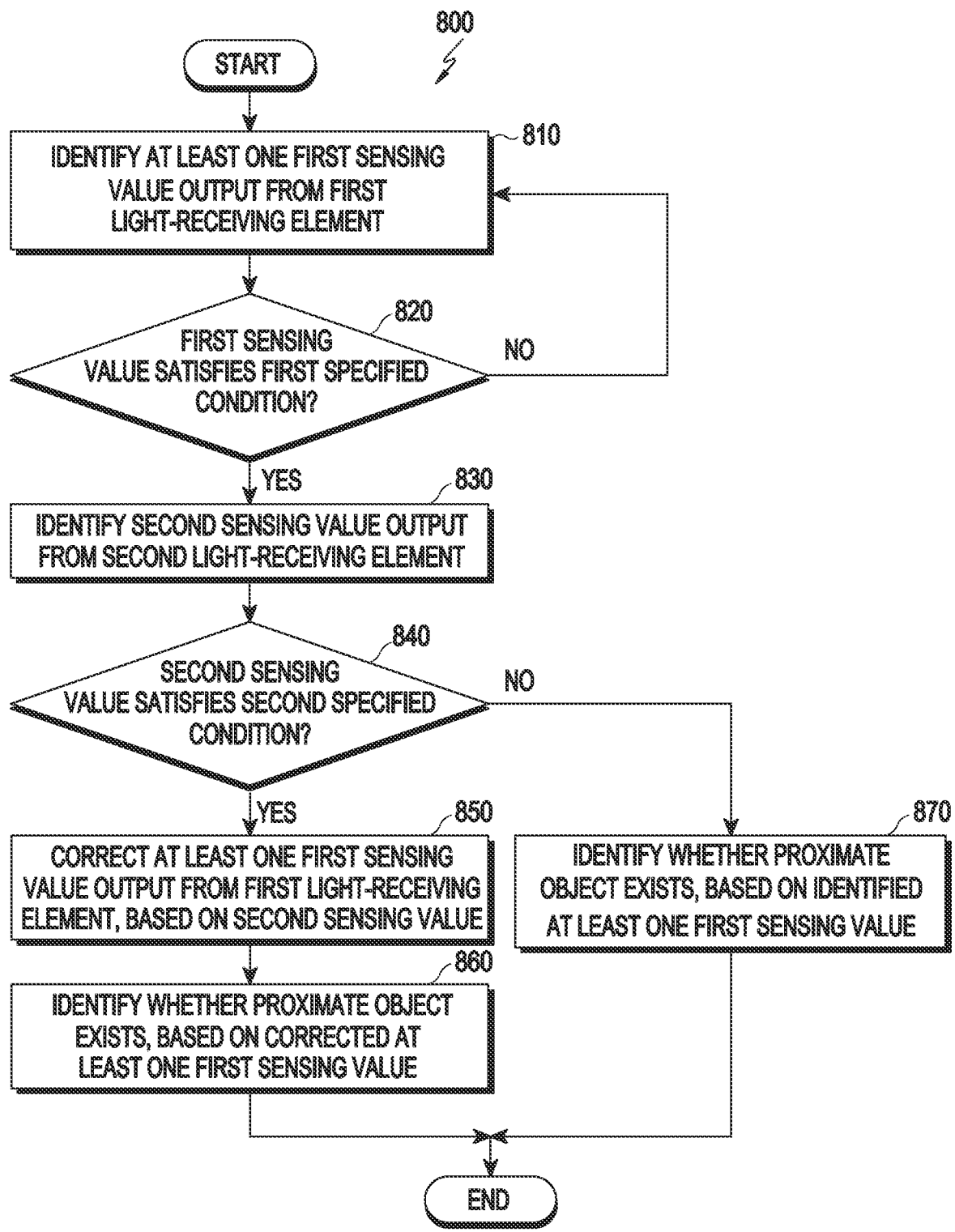
FIG. 8 is a flowchart illustrating an example of a method for identifying object proximity by an electronic device, according to various embodiments.

FIG. 8 is a flowchart illustrating an example of a method for identifying object proximity by an electronic device according to various embodiments. Hereinafter, the operations of the electronic device 101 are described with reference to FIG. 5A, FIG. 5B, and/or FIG. 5C.

According to various embodiments, in operation 810, the electronic device 101 may identify at least one first sensing value output from the first light-receiving element 520. According to various embodiments, the electronic device 101 may monitor the at least one first sensing value while a prespecified application and/or a prespecified function is executed. According to various embodiments, the electronic device 101 may refrain from transmitting a control signal (e.g., a driving signal) to the second light-receiving element 530 while performing operation 810. The control signal (e.g., a driving signal) is not transmitted to the second light-receiving element 530, and thus the second light-receiving element 530 may not operate. According to an embodiment, while operation 810 is performed, the second light-receiving element 530 may output a second sensing value, and the electronic device 101 may ignore the output second sensing value.

According to various embodiments, in operation 820, the electronic device 101 may identify whether a first sensing value satisfies a first specified condition. For example, the electronic device 101 may identify whether the first sensing value exceeds a threshold for detecting proximity. For example, the threshold may include a value greater than the first reference value and/or the second reference value. The first sensing value exceeding the threshold may include that the first sensing value also exceeds a first reference value. According to various embodiments, when the first sensing value which satisfies the first specified condition is not identified, the electronic device 101 may perform operation 810 again to monitor first sensing values output from the first light-receiving element 520.

According to various embodiments, when it is identified that the first sensing value satisfies the first specified condition, in operation 830, the electronic device 101 may identify the second sensing value output from the second light-receiving element 530. According to various embodiments, when it is identified that the first sensing value satisfies the first specified condition, the electronic device 101 may transmit a control signal (e.g., a driving signal) to the second light-receiving element 530 to control the second light-receiving element 530 to detect whether light (e.g., an infrared ray) is received.

According to various embodiments, in operation 840, the electronic device 101 may identify whether the second sensing value satisfies a second specified condition. For example, the electronic device 101 may identify whether the second sensing value exceeds a second reference value. According to an embodiment, the electronic device 101 may monitor the at least one first sensing value while whether the second sensing value exceeds the second reference value is determined, and while the first sensing value exceeds a threshold (e.g., a value greater than the first reference value) for detecting proximity, identify whether the second sensing value exceeds the second reference value.

According to various embodiments, when it is identified that the second sensing value satisfies the second specified condition, in operation 850, the electronic device 101 may correct the at least one sensing value output from the first light-receiving element, based on the second sensing value. According to various embodiments, when the second sensing value satisfying the second specified condition is identified while the first sensing value exceeding the threshold for detecting proximity is identified (e.g., the first sensing value is different from the first reference value), the electronic device 101 may identify that a temperature drift has occurred in the first light-receiving element 520 and/or the second light-receiving element 530. For example, the electronic device 101 may correct the first sensing value identified as satisfying the first specified condition, based on the second sensing value identified as satisfying the second specified condition. For another example, after it is identified that the second sensing value satisfies the specified conditions, the electronic device 101 may identify the at least one first sensing value output from the first light-receiving element 520 and at least one second sensing value output from the second light-receiving element 530, and correct the identified first sensing value, based on the identified second sensing value. After it is identified that the second sensing value satisfies the specified conditions, the electronic device 101 may identify the at least one first sensing value output from the first light-receiving element 520 and the at least one second sensing value output from the second light-receiving element 530, and when the first sensing value which satisfies the first specified condition is not identified, perform operation 810 again. According to various embodiments, the electronic device 101 may correct the at least one first sensing value, based on the degree of change in the second sensing value, which is described in more detail with reference to drawings to be described later.

According to various embodiments, in operation 860, the electronic device 101 may identify whether the proximate object 540 exists, based on the corrected at least one first sensing value. For example, the electronic device 101 may identify whether the corrected at least one first sensing value exceeds the threshold for detecting proximity.

According to various embodiments, when it is identified that the second sensing value does not satisfy the second specified condition, in operation 870, the electronic device 101 may identify whether the proximate object 540 exists, based on the identified at least one first sensing value. According to various embodiments, when the second sensing value which satisfies the second specified condition is not identified, the electronic device 101 may identify that a temperature drift has not occurred in the first light-receiving element 520 and/or the second light-receiving element 530. For example, the electronic device 101 may identify that the proximate object 540 exists, based on the identification of the first sensing value which satisfies the first specified condition (e.g., exceeds the threshold for detecting proximity). For another example, after it is identified that the second sensing value does not satisfy the second specified condition, the electronic device may identify whether the at least one first sensing value output from the first light-receiving element 520 satisfies the first specified condition.

According to various embodiments, after performing operation 860 or 870, the electronic device 101 may repeatedly perform at least one of operation 810 and subsequent operations. For example, after performing operation 860, the electronic device 101 may monitor sensing values of the first light-receiving element 520 to perform operation 820 and subsequent operations.

Figure 9:
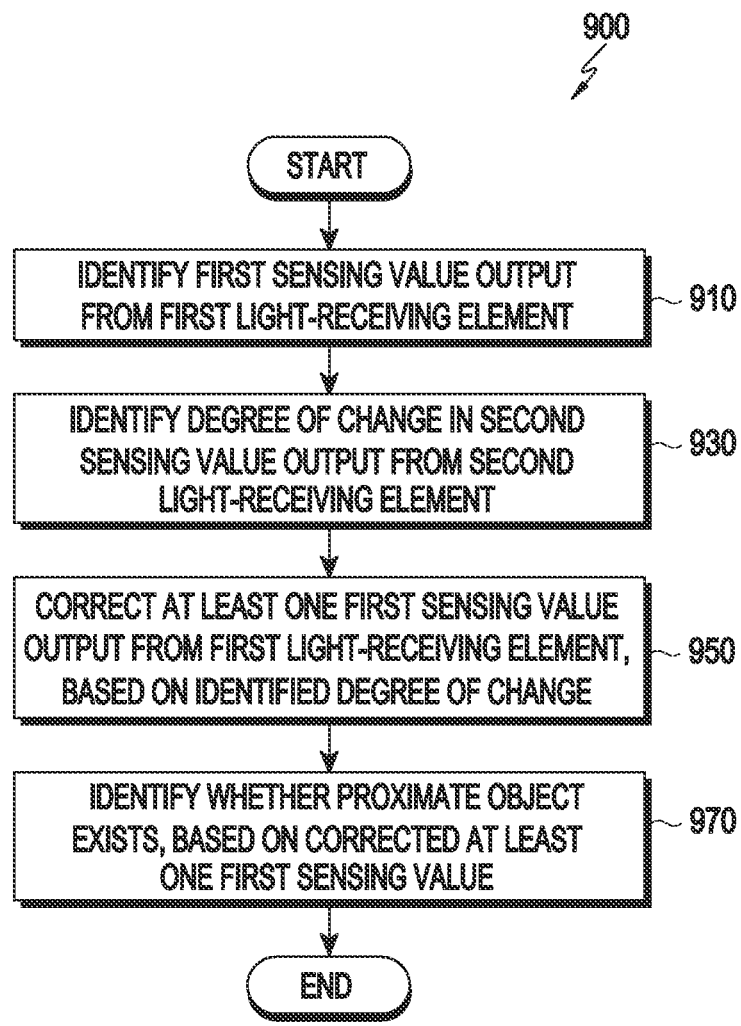
FIG. 9 is a flowchart illustrating a method for correcting a sensing value of a first light-receiving element, by an electronic device, based on a sensing value of a second light-receiving element, according to various embodiments.

FIG. 9 is a flowchart illustrating a method for correcting a sensing value of a first light-receiving element by an electronic device based on a sensing value of a second light-receiving element according to various embodiments. Hereinafter, the operations of the electronic device 101 are described with reference to FIG. 5A, FIG. 5B, and/or FIG. 5C.

According to various embodiments, in operation 910, the electronic device 101 may identify a first sensing value output from the first light-receiving element 520.

According to various embodiments, in operation 930, the electronic device 101 may identify the degree of change in a second sensing value output from the second light-receiving element 530. For example, when the first sensing value and the second sensing value satisfy a specified condition (e.g., operation 730—Yes), or the second sensing value satisfies a second specified condition (e.g., operation 840—

Yes), the electronic device 101 may identify the degree to which the second sensing value is changed with respect to a second reference value.

For example, the electronic device 101 may identify a change amount X1 of the second sensing value by subtracting the second reference value from the second sensing value (e.g., Equation 1).

$$X_1 = \text{Drift Sub ADC} - \text{Base Sub ADC} \quad \text{Equation 1}$$

For another example, the electronic device 101 may identify a change rate X2 of the second sensing value by dividing the second sensing value by the second reference value (e.g., Equation 2).

$$X_2 = \frac{\text{Drift Sub } ADC}{\text{Base Sub } ADC} \quad \text{Equation 2}$$

In Equations 1 and 2, the "Drift Sub ADC" may indicate the second sensing value identified when the first sensing value and the second sensing value satisfy the specified condition (e.g., operation 730—Yes) or the second sensing value satisfies the second specified condition (e.g., operation 840—Yes). The "Base Sub ADC" may indicate the second reference value.

For still another example, the electronic device 101 may differently determine the change amount X1 of the second sensing value, based on a variable value a (e.g., Equation 3 or Equation 4).

$$X_{1(1)} = (\text{Drift Sub ADC} + a) - \text{Base Sub ADC} \quad \text{Equation 3}$$

$$X_{1(2)} = (\text{Drift Sub ADC} \times a) - \text{Base Sub ADC} \quad \text{Equation 4}$$

According to various embodiments, in operation 950, the electronic device 101 may correct at least one first sensing value output from the first light-receiving element 520, based on the identified degree of change.

For example, the electronic device 101 may correct at least one sensing value output from the first light-receiving element 520, based on the change amount X1 of the second sensing value (e.g., equation 5). This case may be a case in which the effects of the heat generation of the light-emitting element 510 and/or the first light-receiving element 520 on the first light-receiving element 520 and the second light-receiving element 530 are similar (e.g., the same within an error range). For example, as shown in FIG. 5B, the first light-receiving element 520 and the second light-receiving element 530 may be disposed at equal intervals from the light-emitting element 510.

$$\text{Offset Main ADC} = \text{Drift Main ADC} - X_1 \quad \text{Equation 5}$$

For another example, the electronic device 101 may correct the at least one first sensing value output from the first light-receiving element 520, based on a change degree X2 of the second sensing value (e.g., equation 6). This case may be a case in which the effects of the heat generation of the light-emitting element 510 and/or the first light-receiving element 520 on the first light-receiving element 520 and the second light-receiving element 530 are different. For example, as shown in FIG. 5A or 5C, the first light-receiving element 520 and the second light-receiving element 530 may be disposed at different intervals from the light-emitting element 510.

$$\text{Offset Main } ADC = \frac{\text{Drift Main } ADC}{X_2} \quad \text{Equation 6}$$

In Equations 5 and 6, the "Drift Main ADC" may indicate the at least one sensing value output from the first light-receiving element 520. The "Offset Main ADC" may indicate the corrected at least one first sensing value of the first light-receiving element 520.

According to the method described above, the corrected sensing value (e.g., Offset Main ADC) identified while the proximate object 540 does not exist may have a value similar to (e.g., the same within an error range) a first reference value (e.g., Base main ADC).

According to various embodiments, in operation 970, the electronic device 101 may identify whether the proximate object 540 exists, based on the corrected at least one sensing value. For example, the electronic device 101 may identify whether the corrected at least one sensing value exceeds the threshold for detecting proximity.

Figure 10:
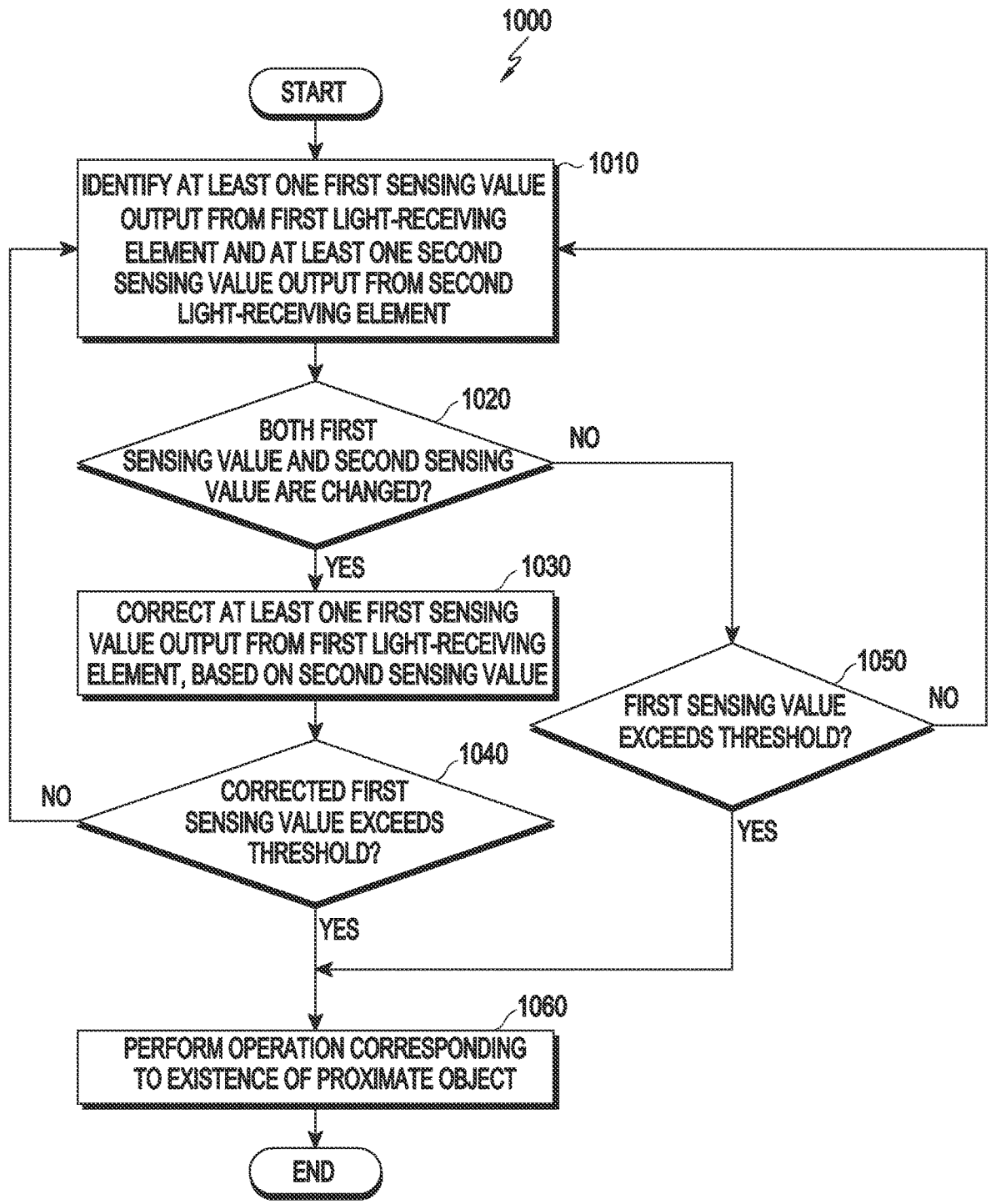
FIG. 10 is a flowchart illustrating an example of a method for identifying object proximity by an electronic device, according to various embodiments.

FIG. 10 is a flowchart 1000 illustrating an example of a method for identifying object proximity by an electronic device according to various embodiments. Hereinafter, the operations of the electronic device 101 are described with reference to FIG. 5A, FIG. 5B, and/or FIG. 5C.

According to various embodiments, in operation 1010, the electronic device 101 may identify at least one first sensing value output from the first light-receiving element 520 and at least one second sensing value output from the second light-receiving element 530. According to various embodiments, the electronic device 101 may monitor the at least one first sensing value and the at least one second sensing value together (e.g., in parallel).

According to various embodiments, in operation 1020, the electronic device 101 may identify whether both a first sensing value and a second sensing value are changed. For example, the electronic device 101 may monitor the at least one first sensing value and the at least one second sensing value together (e.g., in parallel), so as to identify whether the first sensing value exceeds a first reference value and the second sensing value exceeds a second reference value.

According to various embodiments, when it is identified that both the first sensing value and the second sensing value are changed, in operation 1030, the electronic device 101 may correct the at least one first sensing value output from the first light-receiving element 520, based on the second sensing value. According to various embodiments, when the first sensing value exceeding the first reference value and the second sensing value exceeding the second reference value are identified, the electronic device 101 may identify that a temperature drift has occurred in the first light-receiving element 520 and/or the second light-receiving element 530. For example, the electronic device 101 may correct the first sensing value identified as exceeding the first reference value, based on the second sensing value identified as exceeding the second reference value. For another example, after the first sensing value exceeding the first reference value and the second sensing value exceeding the second reference value are identified, the electronic device may identify the at least one first sensing value output from the first light-receiving element 520 and the at least one second sensing value output from the second light-receiving element 530, and correct the identified first sensing value, based on the identified second sensing value.

According to various embodiments, in operation 1040, the electronic device 101 may identify whether the corrected first sensing value exceeds a threshold. For example, the electronic device 101 may identify whether the corrected first sensing value exceeds the threshold for detecting proximity.

According to various embodiments, when it is identified that neither the first sensing value nor the second sensing value is changed, in operation 1050, the electronic device 101 may identify whether the first sensing value exceeds the threshold. For example, until the first sensing value exceeding the first reference value and the second sensing value exceeding the second reference value are identified, the electronic device 101 may identify whether the at least one first sensing value output from the first light-receiving element 520 exceeds the threshold for detecting proximity.

According to various embodiments, when it is identified that the first sensing value in operation 1050 does not exceed the threshold or the corrected first sensing value in operation 1040 does not exceed the threshold, the electronic device 101 may perform operation 1010 again.

According to various embodiments, when it is identified that the first sensing value exceeds the threshold or the corrected first sensing value exceeds the threshold, in operation 1060, the electronic device 101 may perform an operation corresponding to the existence of the proximate object 540. For example, the electronic device 101 may perform an operation of turning off a display (e.g., the display module 301 of FIG. 3A) or adjusting the brightness of the display (e.g., the display module 301).

According to various embodiments, after performing operation 1060, the electronic device 101 may perform operation 1010 and subsequent operations. For example, after performing operation 1060, the electronic device 101 may repeat operation 1010 and subsequent operations until the execution of a prespecified application and/or a prespecified function is terminated.

Figure 11:
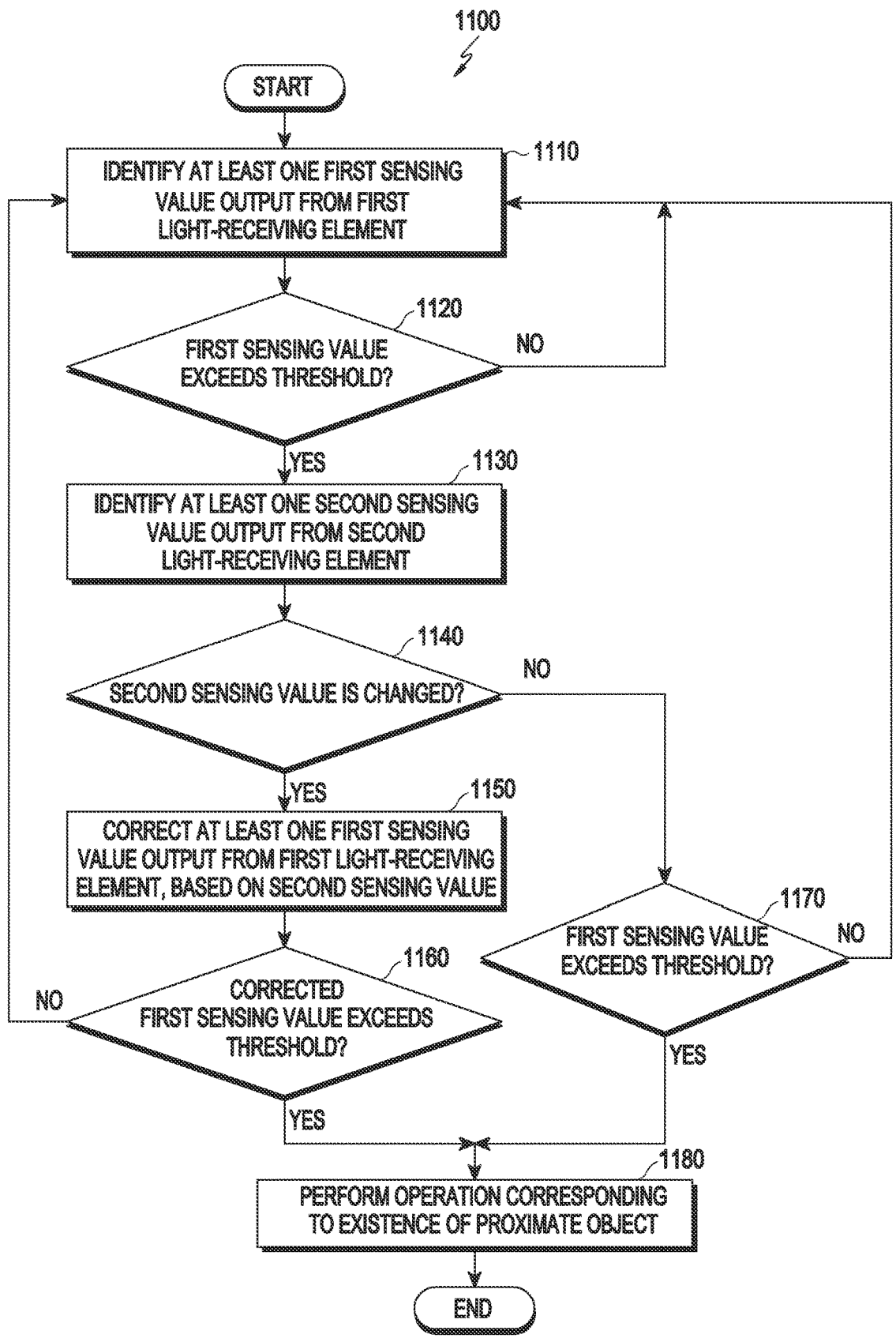
FIG. 11 is a flowchart illustrating an example of a method for identifying object proximity by an electronic device, according to various embodiments.

FIG. 11 is a flowchart illustrating an example of a method for identifying object proximity by an electronic device according to various embodiments. Hereinafter, the operations of the electronic device 101 are described with reference to FIG. 5A, FIG. 5B, and/or FIG. 5C.

According to various embodiments, in operation 1110, the electronic device 101 may identify at least one first sensing value output from the first light-receiving element 520. According to various embodiments, during operation 1110, the electronic device 101 may control the second light-receiving element 530 not to operate or may ignore at least one second sensing value output from the second light-receiving element 530.

According to various embodiments, in operation 1120, the electronic device 101 may identify whether a first sensing value exceeds a threshold. For example, the electronic device 101 may identify whether the first sensing value exceeds the threshold for detecting proximity.

According to various embodiments, when it is identified that the first sensing value exceeds the threshold, in operation 1130, the electronic device 101 may identify the at least one second sensing value output from the second light-receiving element 530. According to various embodiments, when it is identified that the first sensing value exceeds the threshold, the electronic device 101 may transmit a control signal (e.g., a driving signal) to the second light-receiving element 530 so as to control the second light-receiving element 530 to detect whether light (e.g., an infrared ray) is received. According to an embodiment, when it is identified that the first sensing value exceeds the threshold, the electronic device 101 may presume that the proximate object 540 exists. According to various embodiments, when the first sensing value exceeding the threshold is not identified, the electronic device 101 may perform operation 1110 again to monitor first sensing values output from the first light-receiving element 520.

According to various embodiments, in operation 1140, the electronic device 101 may identify whether a second sensing value is changed. For example, the electronic device 101 may identify whether the second sensing value exceeds a second reference value. According to an embodiment, the electronic device 101 may monitor the at least one first sensing value while whether the second sensing value exceeds the second reference value is identified, and identify whether the second sensing value exceeds the second reference value while the first sensing value exceeds the threshold for detecting proximity (e.g., a value greater than a first reference value).

According to various embodiments, when it is identified that the second sensing value is changed, in operation 1150, the electronic device 101 may correct the at least one sensing value output from the first light-receiving element 520, based on the second sensing value. According to various embodiments, when it is identified that the second sensing value has changed while the first sensing value exceeding the threshold for detecting proximity is identified (e.g., the first sensing value is different from the first reference value), the electronic device 101 may identify that a temperature drift has occurred in the first light-receiving element 520 and/or the second light-receiving element 530. For example, the electronic device 101 may correct the first sensing value exceeding the threshold for detecting proximity, based on the second sensing value identified as exceeding the second reference value. For another example, after it is identified that the second sensing value exceeds the second reference value, the electronic device 101 may identify the at least one first sensing value output from the first light-receiving element 520 and the at least one second sensing value output from the second light-receiving element 530, and correct the identified first sensing value, based on the identified second sensing value. After it is identified that the second sensing value exceeds the second reference value, the electronic device 101 may identify the at least one first sensing value output from the first light-receiving element 520 and the at least one second sensing value output from the second light-receiving element 530, and when the first sensing value exceeding the first reference value or the threshold for detecting proximity is not identified, perform operation 1110 again. According to various embodiments, the electronic device 101 may correct the at least one first sensing value, based on the degree of change in the second sensing value.

According to various embodiments, in operation 1160, the electronic device 101 may identify whether the corrected first sensing value exceeds the threshold. For example, the electronic device 101 may identify whether the corrected value of the first sensing value identified as exceeding the threshold exceeds the threshold for detecting proximity.

According to various embodiments, when it is identified that the second sensing value is not changed, in operation 1170, the electronic device 101 may identify whether the first sensing value exceeds the threshold. According to various embodiments, when the second sensing value exceeding the second reference value is not identified, the electronic device 101 may identify that a temperature drift has not occurred in the first light-receiving element 520 and/or the second light-receiving element 530. For example, the electronic device 101 may identify that the proximate object 540 exists, based on the identification of the first sensing value exceeding the threshold for detecting proximity. For another example, after it is identified that the second sensing value does not satisfy the second specified condition, the electronic device may identify whether the at least one first sensing value output from the first light-receiving element 520 exceeds the threshold for detecting proximity.

According to various embodiments, when it is identified that the first sensing value in operation 1170 does not exceed the threshold or the corrected first sensing value in operation 1160 does not exceed the threshold, the electronic device 101 may perform operation 1110 again.

According to various embodiments, when it is identified that the first sensing value exceeds the threshold or the corrected first sensing value exceeds the threshold, in operation 1180, the electronic device 101 may perform an operation corresponding to the existence of the proximate object 540. For example, the electronic device 101 may perform an operation of turning off a display (e.g., the display module 301 of FIG. 3A) or adjusting the brightness of the display (e.g., the display module 301).

According to various embodiments, after performing operation 1180, the electronic device 101 may perform operation 1110 and subsequent operations. For example, after performing operation 1180, the electronic device 101 may repeat operation 1110 and subsequent operations until the execution of a prespecified application and/or a prespecified function is terminated.

Figure 12:
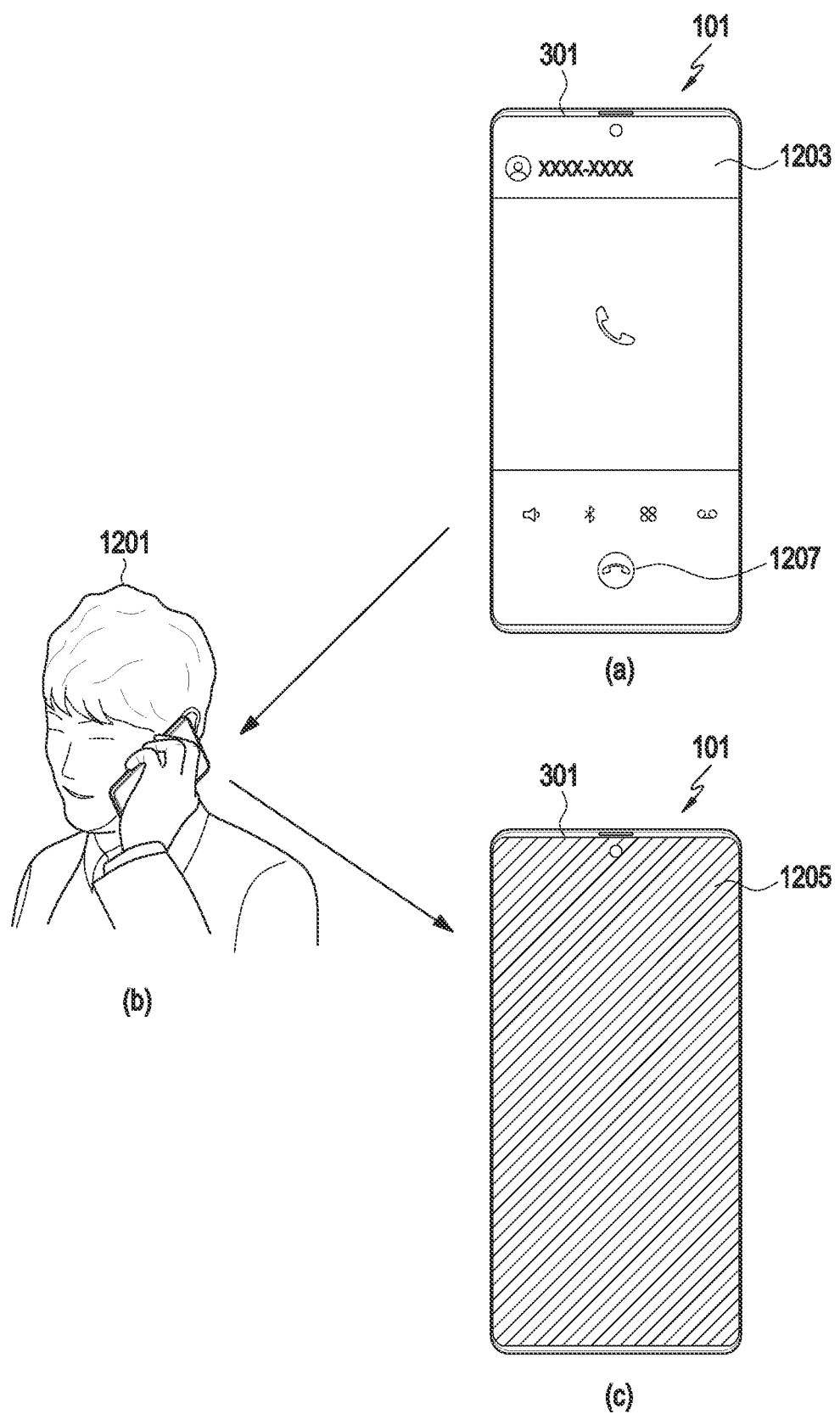
FIG. 12 is a diagram illustrating an example of an operation performed by an electronic device at the time of detecting object proximity, according to various embodiments.

FIG. 12 is a diagram illustrating an example of an operation performed by an electronic device at the time of detecting object proximity, according to various embodiments. Hereinafter, the operations of the electronic device 101 are described with reference to FIG. 5A, FIG. 5B, and/or FIG. 5C.

According to various embodiments, the electronic device 101 may identify whether the proximate object 540 exists, by using the proximity sensor 300, based on executing a prespecified application and/or a prespecified function. For example, the electronic device 101 may identify whether the proximate object 540 exists by using the proximity sensor 300 when a call application is executed and/or a call function with an external electronic device (e.g., the electronic device 102 or 104 of FIG. 1) is executed (e.g., a call session is established) using the call application. Referring to case (a) of FIG. 12, a state in which an execution screen 1203 of the currently executed call application is displayed on a display (e.g., the display module 301) is shown. According to various embodiments, the electronic device 101 may display the execution screen 1203 with a first brightness through the display (e.g., the display module 301). Referring to case (b) of FIG. 12, when a user 1201 brings the electronic device 101 proximate to the body (e.g., an ear), the electronic device 101 may identify that the body (e.g., an ear) of the user 1201 proximate to the electronic device 101 exists. According to various embodiments, when it is identified that the body (e.g., an ear) of the user 1201 proximate to the electronic device 101 exists, the electronic device 101 may perform an operation corresponding to the existence of the proximate object 540 (e.g., the ear of the user 1201). For example, referring to case (c) of FIG. 12, the electronic device 101 may turn off 1205 the display (e.g., the display module 301), based on identifying that the body (e.g., an ear) of the user 1201 proximate to the electronic device 101 exists. As the display (e.g., the display module 301) is turned off, the execution screen 1203 may not be displayed. For another example, based on identifying that the body (e.g., an ear) of the user 1201 proximate to the electronic device 101 exists, the electronic device 101 may display the execution screen 1203 with a second brightness lower than the first brightness through the display (e.g., the display module 301). According to various embodiments, when the user 1201 moves the electronic device 101 away from the body (e.g., an ear) (e.g., does not bring the electronic device proximate to the body), the electronic device 101 may identify that an object (e.g., the ear of the user 1201) proximate to the electronic device 101 does not exist. According to various embodiments, when it is identified that an object (e.g., the ear of the user 1201) proximate to the electronic device 101 does not exist, the electronic device 101 may perform an operation corresponding to the nonexistence of the proximate object 540 (e.g., the ear of the user 1201). For example, referring to case (a) of FIG. 12, the electronic device 101 may turn on the display (e.g., the display module 301) again, based on identifying that an object (e.g., the ear of the user 1201) proximate to the electronic device 101 does not exist. As the display (e.g., the display module 301) is turned on, the execution screen 1203 may be displayed again. For another example, based on identifying that an object (e.g., the ear of the user 1201) proximate to the electronic device 101 does not exist, the electronic device 101 may display the execution screen 1203 again with the first brightness higher than the second brightness through the display (e.g., the display module 301). According to various embodiments, when a user input (e.g., a touch) for selecting an end button 1207 displayed on the execution screen 1203 is received, the electronic device 101 may end a proximity detection operation. For example, the electronic device 101 may inactivate the light-emitting element 510, the first light-receiving element 520, and/or the second light-receiving element 530.

According to various embodiments, an electronic device (e.g., the electronic device 101 of FIG. 1) may include: a display (e.g., the display module 301 of FIG. 3A) having at least one hole (e.g., the at least one hole 421*b*, 423*b*, 429*b*, and 425*b* of FIG. 4) disposed in at least a part thereof such that light from the outside can be transmitted therethrough; a light-emitting element (e.g., the light-emitting element 510 of FIG. 5A, FIG. 5B, FIG. 5C, and/or FIG. 5D) disposed under the display and configured to output a first infrared ray to the outside; a first light-receiving element (e.g., the first light-receiving element 520 of FIG. 5A, FIG. 5B, FIG. 5C, and/or FIG. 5D) disposed under the display at a position corresponding to the at least one hole, and configured to receive a second infrared ray transmitted from the outside; a second light-receiving element (e.g., the second light-receiving element 530 of FIG. 5A, FIG. 5B, FIG. 5C, and/or FIG. 5D) disposed under the display at a position where light from the outside is shielded; and at least one processor (e.g., the processor 120 of FIG. 1), wherein the at least one processor is configured to, based on that a first sensing value according to the second infrared ray, output from the first light-receiving element, satisfies a first specified condition, while the first infrared ray is output: based on that a second sensing value output from the second light-receiving element does not satisfy a second specified condition, identify that a proximate object exists, and based on that the second sensing value satisfies the second specified condition, identify that the proximate object does not exist.

According to various embodiments, the at least one processor may be further configured to transmit a control signal to the second light-receiving element, based on that the first sensing value satisfies the first specified condition, and refrain from transmitting the control signal to the second light-receiving element, based on that the first sensing value does not satisfy the first specified condition.

According to various embodiments, the at least one processor may be further configured to identify whether the first sensing value satisfies the first specified condition, and when the first sensing value satisfies the first specified condition, identify the second sensing value output from the second light-receiving element.

According to various embodiments, the at least one processor may be further configured to, based on that the second sensing value does not satisfy the second specified condition, identify whether the proximate object exists, based on at least one first sensing value output from the first light-receiving element.

According to various embodiments, the at least one processor may be further configured to, based on that the second sensing value satisfies the second specified condition, and based on the second sensing value, correct the at least one first sensing value output from the first light receiving-element, and identify whether the proximate object exists, based on the corrected at least one first sensing value.

According to various embodiments, the at least one processor may be further configured to, when the first sensing value exceeds a threshold, identify that the first sensing value satisfies the first specified condition.

According to various embodiments, the at least one processor may be configured to identify that the proximate object does not exist, based on that the corrected at least one first sensing value does not exceed the threshold.

According to various embodiments, the at least one processor may be further configured to identify the first sensing value and the second sensing value, based on identifying that the first sensing value satisfies the first specified condition and the second sensing value satisfies the second specified condition, correct the first sensing value, based on the second sensing value, and identify whether the proximate object exists, based on the corrected first sensing value.

According to various embodiments, the at least one processor may be further configured to transmit a control signal to the second light-receiving element, based on that the first sensing value satisfies the first specified condition, and refrain from transmitting the control signal to the second light-receiving element, based on that the first sensing value does not satisfy the first specified condition.

According to various embodiments, the at least one processor may be further configured to, based on identifying that the second sensing value exceeds a prespecified value corresponding to the second light-receiving element, identify that the second sensing value satisfies the second specified condition, and based on identifying that the second sensing value satisfies the second specified condition, correct the at least one first sensing value output from the first light-receiving element, based on the degree of change in the second sensing value.

According to various embodiments, the degree of change in the second sensing value may include at least one of a difference between the prespecified value and the second sensing value or a ratio of the second sensing value to the prespecified value, and the at least one processor may be configured to correct the at least one first sensing value, based on a result of calculating at least one of the at least one first sensing value and the difference or the ratio.

According to various embodiments, the at least one processor may be further configured to turn off the display or adjust brightness of the display, based on identifying that the proximate object exists.

According to various embodiments, the display may further include a subsidiary material layer (e.g., the subsidiary material layer 420 of FIG. 4), at least a part of which is disposed under a display panel, the at least one hole may be disposed in at least a part of the subsidiary material layer, and the second light-receiving element may be disposed at a position where the at least one hole is not disposed.

According to various embodiments, the second light-receiving element may be disposed in the same direction as that of the first light-receiving element, or disposed in a direction opposite to that of the first light-receiving element, with respect to the light-emitting element.

According to various embodiments, an electronic device may include: a display having at least one hole disposed in at least a part thereof such that light from the outside can be transmitted therethrough; a light-emitting element disposed under the display and configured to output a first infrared ray to the outside; a first light-receiving element disposed under the display at a position corresponding to the at least one hole, and configured to receive a second infrared ray transmitted from the outside; a second light-receiving element disposed under the display at a position where light from the outside is shielded; and at least one processor, wherein the at least one processor is configured to, while the first infrared ray is output, identify a first sensing value according to the second infrared ray, output from the first light-receiving element, and a second sensing value output from the second light-receiving element, based on that the identified second sensing value satisfies a second specified condition and based on the identified second sensing value, correct the first sensing value, and identify that a proximate object exists, based on the corrected first sensing value.

According to various embodiments, the at least one processor may be further configured to, based on that the identified second sensing value does not satisfy the second specified condition, and based on the identified first sensing value, identify whether the proximate object exists.

According to various embodiments, the at least one processor may be configured to identify that the second sensing value satisfies the second specified condition, based on identifying that the second sensing value exceeds a prespecified value corresponding to the second light-receiving element, and based on identifying that the second sensing value satisfies the second specified condition and based on the degree of change in the second sensing value, correct at least one first sensing value output from the first light-receiving element.

According to various embodiments, an electronic device may include: a display having at least one hole disposed in at least a part thereof such that light from the outside can be transmitted therethrough; a light-emitting element disposed under the display and configured to output a first infrared ray to the outside; a first light-receiving element disposed under the display at a position corresponding to the at least one hole, and configured to receive a second infrared ray transmitted from the outside; a second light-receiving element disposed under the display at a position where light from the outside is shielded; and at least one processor, wherein the at least one processor is configured to, while the first infrared ray is output, identify a first sensing value according to the second infrared ray, output from the first light-receiving element, identify a second sensing value output from the second light-receiving element, based on that the identified first sensing value satisfies a first specified condition, correct at least one first sensing value output from the first light-receiving element, based on the identified second sensing value, and identify whether a proximate object exists, based on the corrected at least one first sensing value.

According to various embodiments, the at least one processor may be further configured to transmit a control signal to the second light-receiving element, based on that the first sensing value satisfies the first specified condition, and refrain from transmitting the control signal to the second light-receiving element, based on that the first sensing value does not satisfy the first specified condition.

According to various embodiments, the at least one processor may be configured to, based on that the identified second sensing value satisfies a second specified condition, correct the at least one first sensing value, based on the identified second sensing value, and the at least one processor may be further configured to, based on that the identified second sensing value does not satisfy the second specified condition and the identified first sensing value, identify whether the proximate object exists.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
  a display having at least one hole disposed in at least a part thereof such that light from an outside can be transmitted therethrough;
  a light-emitting element disposed under the display and configured to output a first infrared ray to the outside;
  a first light-receiving element disposed under the display at a position corresponding to the at least one hole, and configured to receive a second infrared ray transmitted from the outside;
  a second light-receiving element disposed under the display at a position where light from the outside is shielded; and
  at least one processor,
  wherein the at least one processor is configured to,
  based on that a first sensing value according to the second infrared ray, output from the first light-receiving element, satisfies a first specified condition, while the first infrared ray is output:
    based on that a second sensing value output from the second light-receiving element does not satisfy a second specified condition, identify that a proximate object exists, and based on that the second sensing value satisfies the second specified condition, identify that the proximate object does not exist.

2. The electronic device of claim 1, wherein the at least one processor is further configured to:
based on that the first sensing value satisfies the first specified condition, transmit a control signal to the second light-receiving element, and
based on that the first sensing value does not satisfy the first specified condition, refrain from transmitting the control signal to the second light-receiving element.

3. The electronic device of claim 1, wherein the at least one processor is further configured to:
identify whether the first sensing value satisfies the first specified condition, and
when the first sensing value satisfies the first specified condition, identify the second sensing value output from the second light-receiving element.

4. The electronic device of claim 1, wherein the at least one processor is further configured to, based on that the second sensing value does not satisfy the second specified condition, and based on at least one first sensing value output from the first light-receiving element, identify whether the proximate object exists.

5. The electronic device of claim 1, wherein the at least one processor is further configured to:
based on that the second sensing value satisfies the second specified condition, and based on the second sensing value, correct at least one first sensing value output from the first light-receiving element,
identify whether the proximate object exists, based on the corrected at least one first sensing value.

6. The electronic device of claim 5, wherein the at least one processor is further configured to, when the first sensing value exceeds a threshold, identify that the first sensing value satisfies the first specified condition.

7. The electronic device of claim 6, wherein the at least one processor is further configured to identify that the proximate object does not exist, based on that the corrected at least one first sensing value does not exceed the threshold.

8. The electronic device of claim 1, wherein the at least one processor is further configured to:
identify the first sensing value and the second sensing value,
based on identifying that the first sensing value satisfies the first specified condition and the second sensing value satisfies the second specified condition and based on the second sensing value, correct the first sensing value, and
identify whether the proximate object exists, based on the corrected first sensing value.

9. The electronic device of claim 1, wherein the at least one processor is further configured to:
based on that the first sensing value satisfies the first specified condition, transmit a control signal to the second light-receiving element, and
based on that the first sensing value does not satisfy the first specified condition, refrain from transmitting the control signal to the second light-receiving element.

10. The electronic device of claim 1, wherein the at least one processor is further configured to:
based on identifying that the second sensing value exceeds a prespecified value corresponding to the second light-receiving element, identify that the second sensing value satisfies the second specified condition, and based on identifying that the second sensing value satisfies the second specified condition, and based on a degree of change in the second sensing value, correct at least one first sensing value output from the first light-receiving element.

11. The electronic device of claim 10, wherein the degree of change in the second sensing value comprises at least one of a difference between the prespecified value and the second sensing value or a ratio of the second sensing value to the prespecified value, and
wherein the at least one processor is configured to correct the at least one first sensing value, based on a result of calculating at least one of the at least one first sensing value and the difference or the ratio.

12. The electronic device of claim 1, wherein the at least one processor is further configured to turn off the display or adjust brightness of the display, based on identifying that the proximate object exists.

13. The electronic device of claim 1, wherein the display further comprises a subsidiary material layer, at least a part of which is disposed under a display panel,
wherein the at least one hole is disposed in at least a part of the subsidiary material layer, and
wherein the second light-receiving element is disposed at a position where the at least one hole is not disposed.

14. The electronic device of claim 1, wherein the second light-receiving element is disposed in the same direction as that of the first light-receiving element, or is disposed in a direction opposite to that of the first light-receiving element, with respect to the light-emitting element.

15. An electronic device comprising:
a display having at least one hole disposed in at least a part thereof such that light from an outside can be transmitted therethrough;
a light-emitting element disposed under the display and configured to output a first infrared ray to the outside;
a first light-receiving element disposed under the display at a position corresponding to the at least one hole, and configured to receive a second infrared ray transmitted from the outside;
a second light-receiving element disposed under the display at a position where light from the outside is shielded; and
at least one processor,
wherein the at least one processor is configured to:
while the first infrared ray is output, identify a first sensing value according to the second infrared ray, output from the first light-receiving element, and a second sensing value output from the second light-receiving element,
based on that the identified second sensing value satisfies a second specified condition, and based on the identified second sensing value, correct the first sensing value, and
identify whether a proximate object exists, based on the corrected first sensing value.

16. The electronic device of claim 15, wherein the at least one processor is further configured to, based on that the identified second sensing value does not satisfy the second specified condition, and based on the identified first sensing value, identify whether the proximate object exists.

17. The electronic device of claim 15, wherein the at least one processor is configured to:
based on identifying that the second sensing value exceeds a prespecified value corresponding to the second light-receiving element, identify that the second sensing value satisfies the second specified condition, and based on identifying that the second sensing value satisfies the second specified condition and based on a degree of change in the second sensing value, correct at least one first sensing value output from the first light-receiving element.

18. An electronic device comprising:

a display having at least one hole disposed in at least a part thereof such that light from an outside can be transmitted therethrough;

a light-emitting element disposed under the display and configured to output a first infrared ray to the outside;

a first light-receiving element disposed under the display at a position corresponding to the at least one hole, and configured to receive a second infrared ray transmitted from the outside;

a second light-receiving element disposed under the display at a position where light from the outside is shielded; and at least one processor, wherein the at least one processor is configured to:

while the first infrared ray is output, identify a first sensing value according to the second infrared ray, output from the first light-receiving element, based on that the identified first sensing value satisfies a first specified condition, identify a second sensing value output from the second light-receiving element, based on the identified second sensing value, correct at least one first sensing value output from the first light-receiving element, and based on the corrected at least one first sensing value, identify whether a proximate object exists.

19. The electronic device of claim 18, wherein the at least one processor is further configured to:

based on that the first sensing value satisfies the first specified condition, transmit a control signal to the second light-receiving element, and based on that the first sensing value does not satisfy the first specified condition, refrain from transmitting the control signal to the second light-receiving element.

20. The electronic device of claim 18, wherein the at least one processor is configured to:

based on that the identified second sensing value satisfies a second specified condition, and based on the identified second sensing value, correct the at least one first sensing value, and wherein the at least one processor is further configured to, based on that the identified second sensing value does not satisfy the second specified condition, and based on the identified first sensing value, identify whether the proximate object exists.

* * * * *